(12) United States Patent
Weyrich

(10) Patent No.: US 7,988,191 B2
(45) Date of Patent: Aug. 2, 2011

(54) AIRBAG MIDULE

(75) Inventor: Christian Weyrich, Elchingen (DE)

(73) Assignee: Takata-Petri AG, Aschaffenburg (DE)

( * ) Notice: Subject to any disclaimer, the term of this patent is extended or adjusted under 35 U.S.C. 154(b) by 0 days.

(21) Appl. No.: 12/662,612

(22) Filed: Apr. 26, 2010

(65) Prior Publication Data

US 2010/0207368 A1 Aug. 19, 2010

Related U.S. Application Data

(63) Continuation of application No. PCT/EP2008/064729, filed on Oct. 30, 2008.

(30) Foreign Application Priority Data

Oct. 30, 2007 (DE) ................. 20 2007 015 431 U

(51) Int. Cl.
    *B60R 21/26* (2006.01)
(52) U.S. Cl. ........................................ 280/736
(58) Field of Classification Search ............... 280/730.2, 280/736, 740–742
    See application file for complete search history.

(56) References Cited

U.S. PATENT DOCUMENTS

| | | | |
|---|---|---|---|
| 5,498,023 A | 3/1996 | Adams et al. | |
| 6,273,456 B1 | 8/2001 | Heigl | |
| 6,338,498 B1 | 1/2002 | Niederman et al. | |
| 6,419,266 B1 * | 7/2002 | Morfouace et al. | 280/740 |
| 6,450,529 B1 | 9/2002 | Kalandek et al. | |
| 6,481,743 B1 | 11/2002 | Tobe et al. | |
| 6,530,595 B2 | 3/2003 | Masuda et al. | |
| 6,630,220 B1 | 10/2003 | Veiga | |
| 6,846,010 B2 | 1/2005 | Enders | |
| 6,883,827 B2 | 4/2005 | Keshavaraj | |
| 6,991,255 B2 | 1/2006 | Henderson et al. | |
| 7,040,652 B2 * | 5/2006 | Ogata et al. | 280/730.2 |
| 7,144,038 B2 | 12/2006 | Keshavaraj | |
| 7,198,293 B2 | 4/2007 | Olson | |
| 7,357,408 B2 | 4/2008 | Hall et al. | |
| 7,469,923 B2 | 12/2008 | Ryan et al. | |
| 7,556,286 B2 | 7/2009 | Powals | |
| 7,658,402 B2 | 2/2010 | Ohba | |
| 7,766,369 B2 | 8/2010 | Bradburn et al. | |
| 2003/0011175 A1 | 1/2003 | Hess et al. | |

(Continued)

FOREIGN PATENT DOCUMENTS

DE 101 22 838 B4 12/2002

(Continued)

*Primary Examiner* — Paul N Dickson
*Assistant Examiner* — Robert A Coker
(74) *Attorney, Agent, or Firm* — Foley & Lardner LLP

(57) ABSTRACT

An airbag module including an airbag, an airbag covering, that defines an interior space of the airbag, that can be filled with gas for inflating the airbag, a gas generator for providing the gas needed for inflating the airbag, an insertion opening of the airbag covering, wherein the gas generator is inserted through the insertion opening into the interior space of the airbag, so that gas provided by the gas generator enters the interior space of the airbag, a boundary region of the insertion opening delimiting the insertion opening, which boundary region annularly encompasses the gas generator, and a sealing means for sealing the insertion opening. The sealing means is arranged between the boundary region and the gas generator so that the sealing means is widened by the gas provided by the gas generator and pressed against the boundary region of the insertion opening for sealing the insertion opening.

15 Claims, 17 Drawing Sheets

U.S. PATENT DOCUMENTS

| | | |
|---|---|---|
| 2003/0057683 A1 | 3/2003 | Wipasuramonton et al. |
| 2003/0094799 A1 | 5/2003 | Smith |
| 2003/0141708 A1 | 7/2003 | Enders |
| 2003/0160434 A1 | 8/2003 | Uchiyama et al. |
| 2003/0178820 A1 | 9/2003 | Green et al. |
| 2003/0205888 A1 | 11/2003 | Keshavaraj |
| 2005/0104335 A1 | 5/2005 | Henderson et al. |
| 2005/0134022 A1 | 6/2005 | Noguchi et al. |
| 2005/0156413 A1 | 7/2005 | Olson |
| 2005/0285378 A1 | 12/2005 | Noguchi et al. |
| 2006/0033318 A1 | 2/2006 | Ryan et al. |
| 2006/0061075 A1 | 3/2006 | Aoki et al. |
| 2006/0192368 A1 | 8/2006 | Hall et al. |
| 2007/0024031 A1 | 2/2007 | Coleman |
| 2007/0164543 A1 | 7/2007 | Fukuda et al. |
| 2007/0273128 A1 | 11/2007 | Cheal |
| 2007/0296188 A1 | 12/2007 | Breuninger |
| 2008/0238059 A1 | 10/2008 | Astrom |
| 2008/0284142 A1 | 11/2008 | Cheal et al. |
| 2009/0001699 A1 | 1/2009 | Honold et al. |
| 2009/0026742 A1 | 1/2009 | Noguchi et al. |
| 2009/0058053 A1 | 3/2009 | Osterhout et al. |
| 2009/0079172 A1 | 3/2009 | Messner et al. |
| 2009/0167007 A1 | 7/2009 | Schindzielorz et al. |
| 2009/0212542 A1 | 8/2009 | Toda et al. |
| 2010/0117343 A1 | 5/2010 | Hoffman et al. |
| 2010/0133795 A1 | 6/2010 | Fukuda et al. |
| 2010/0207367 A1 | 8/2010 | Weyrich et al. |

FOREIGN PATENT DOCUMENTS

| | | |
|---|---|---|
| DE | 20 2005 019 013 U1 | 5/2006 |
| DE | 10 2004 038 459 B4 | 3/2008 |
| EP | 1 310 409 A2 | 5/2003 |
| EP | 1 397 240 B1 | 3/2004 |
| EP | 1 501 707 B1 | 2/2005 |
| EP | 1 698 522 A1 | 9/2006 |
| WO | WO 01/89884 A1 | 11/2001 |
| WO | WO 2006/092226 A2 | 9/2006 |
| WO | WO 2007/062847 A1 | 6/2007 |

* cited by examiner

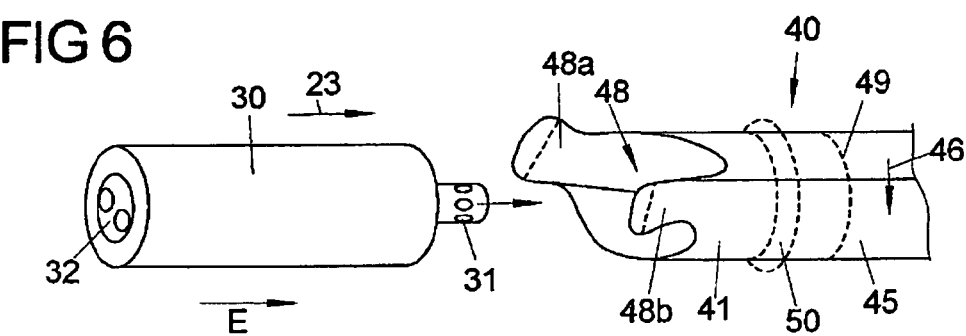
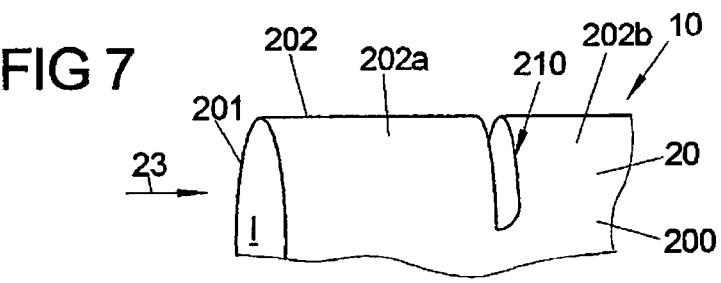
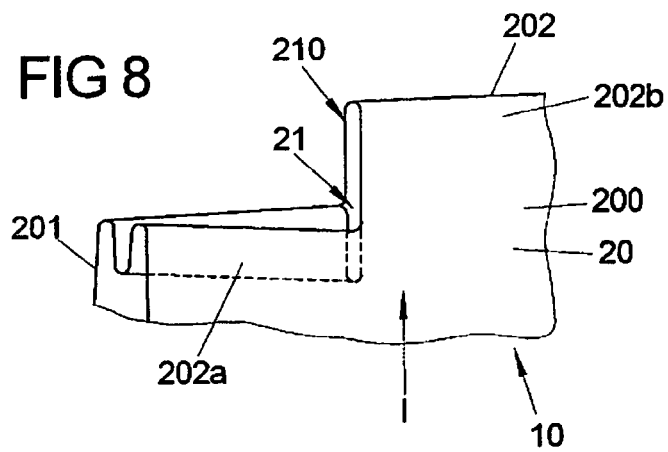
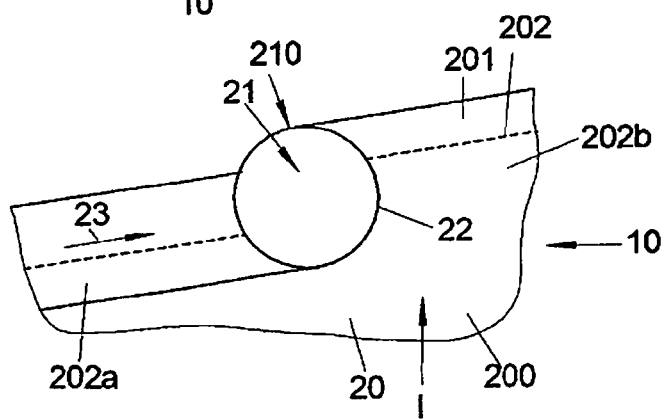

FIG 12
i)
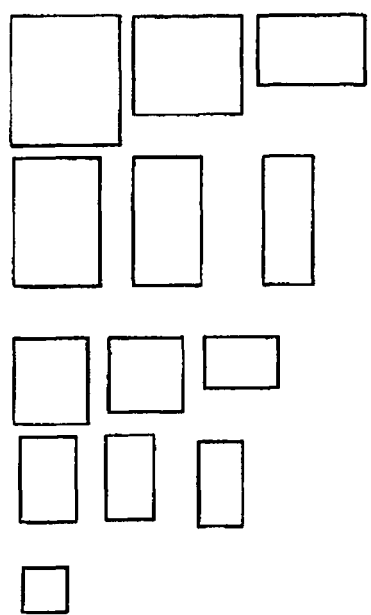
ii)
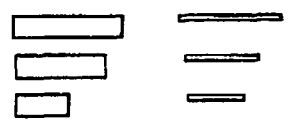
iii)
iv)
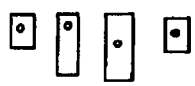
FIG 13
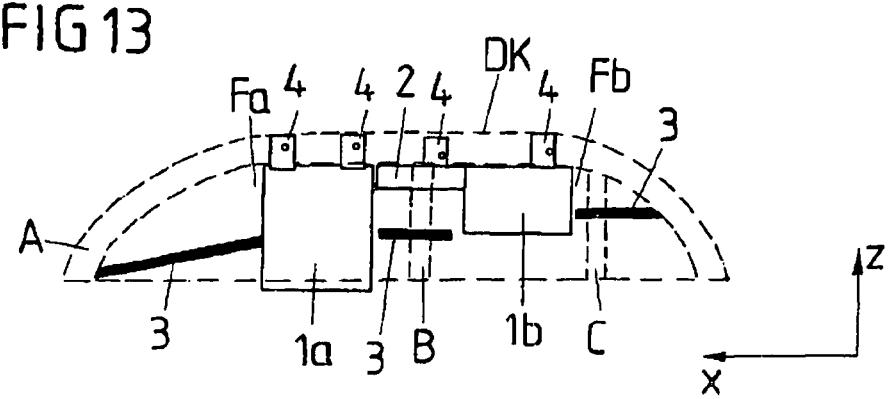

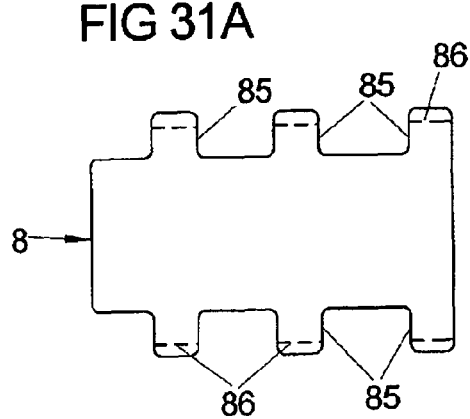
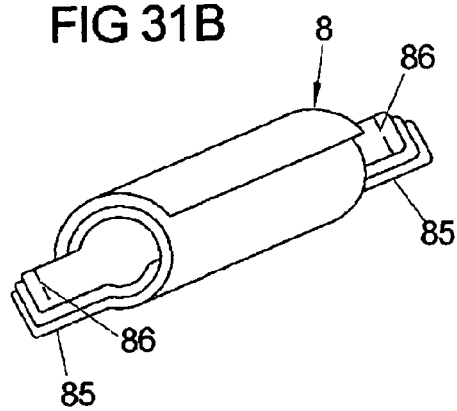
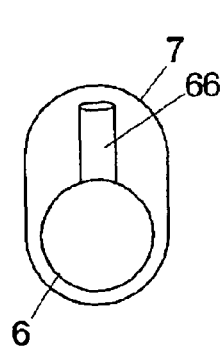
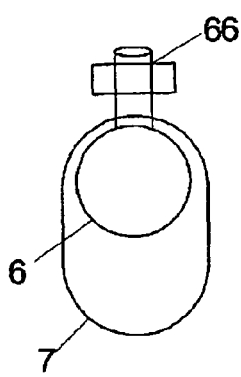
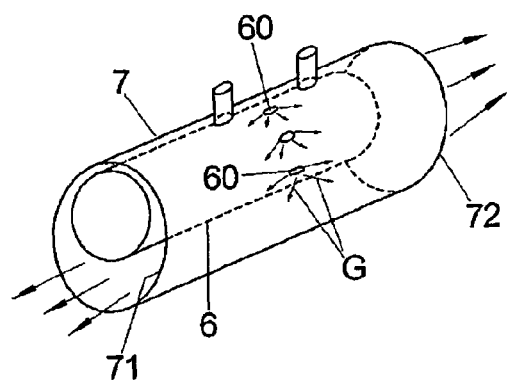
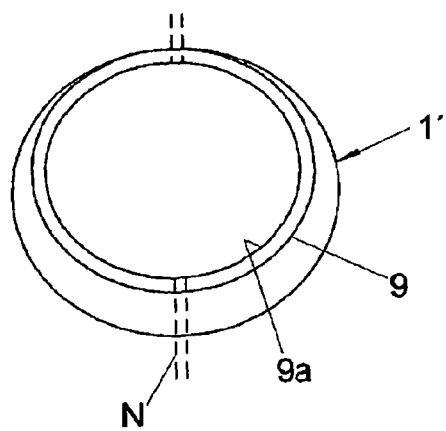

AIRBAG MIDULE

CROSS-REFERENCE TO RELATED PATENT APPLICATIONS

This application is a continuation of International Application PCT/EP2008/064729, which has an international filing date of Oct. 30, 2008; this International Application was not published in English, but was published in German on May 7, 2009 as WO2009/056598. The foregoing application is incorporated herein by reference in its entirety.

BACKGROUND

The invention relates to an airbag module, particularly for a motor vehicle.

Such an airbag module particularly serves for protecting a vehicle occupant, in that, in case of a crash, e.g. in case of a side impact, a collision of the occupant with a lateral window pane of a motor vehicle or a lateral pillar of the vehicle structure, or another motor vehicle part and/or with an object intruding into the vehicle, is prevented.

Such protection devices for vehicle occupants on the basis of an airbag device (also in the form of an airbag module) are generally known. Regularly, such a protection device not only serves for protecting a single vehicle occupant residing e.g. on a front seat of a motor vehicle, but in fact for protecting (at the same time) several vehicle occupants, particularly two occupants sitting one after the other in a motor vehicle, in that the protection device in the form of an airbag device (airbag module) not only extends e.g. in front of frontal but also in front of at least one rear window pane of the motor vehicle, for instance along the vehicle direction from the so-called A-pillar over the B-pillar up to the C- or D-pillar of a motor vehicle. Of course, it can be also a driver airbag device or a co-driver airbag device.

An airbag of such an airbag device or module can protect different body regions of occupants and persons that are to be protected during a crash case, particularly the head or the thorax of an occupant.

Such an airbag module comprises an airbag that can be inflated in or at a motor vehicle in order to protect a person, an airbag covering of the airbag that surrounds an interior space of the airbag that can be filled with gas in order to inflate the airbag, a gas generator for setting free a gas needed for inflating the airbag, an insertion opening of the airbag covering, wherein the gas generator is inserted through said insertion opening into the interior space of the airbag, so that gas set free by the gas generator or flowing out of the gas generator can get into the interior space of the airbag, a boundary region of the insertion opening delimiting the insertion opening, which encompasses the gas generator annularly, and a sealing means for sealing said insertion opening.

Thereby, the insertion opening must not necessarily be arranged at a seam, particularly a peripheral seam of the airbag along which airbag parts are folded on each other, but can in particular also be arranged spaced apart from a cut contour of an airbag part. Particularly, in case of butterfly-layouts, the sealing means is arranged together with the gas generator in the folding edge (folding axis) of the airbag covering.

It would be advantageous to provide for an airbag module of the afore-mentioned kind in case of which the insertion opening of the airbag for a gas generator can be sealed in a simple and cost-effective manner.

SUMMARY

One disclosed embodiment relates to an airbag module. According thereto, the sealing means is arranged between the boundary region and the gas generator inserted into insertion opening in a way, that upon inflation of the airbag the sealing means is pressed against said boundary region of the insertion opening due to the gas flowing out of the gas generator in order to seal said insertion opening (self-actuating seal).

Another embodiment relates to a method for producing an airbag, comprising the steps of: providing an airbag covering of the airbag that surrounds an interior space of the airbag that can be filled with gas in order to inflate the airbag; inserting a sealing means into the insertion opening, so that the sealing means butts against a boundary region of the insertion opening delimiting the insertion opening via a middle portion of the sealing means; and inserting the gas generator into the sealing means, such that gas that is to be provided by the gas generator can get into the interior space of the airbag and that the boundary region delimiting the insertion opening annularly encompasses the gas generator under interposition of the middle portion of the sealing means, so that gas hitting the middle portion presses the middle portion against said boundary region for sealing the insertion opening.

It is to be understood that both the foregoing general description and the following detailed description are exemplary and explanatory only, and are not restrictive of the invention as claimed.

BRIEF DESCRIPTION OF THE DRAWINGS

These and other features, aspects, and advantages of the present invention will become apparent by means of the following description, appended claims and the accompanying exemplary description of embodiments on the basis of the Figures.

FIG. 6 shows a funnel-shaped sealing means of an airbag module according to the invention as well as a gas generator that is introduced into the funnel-shaped region of the sealing means;

FIG. 7-11 show schematical, fragmentary and perspective views of an airbag of an airbag module according to the invention, wherein the insertion opening of the airbag is formed by a cut in a boundary region of the airbag covering of the airbag;

FIG. 12 shows a schematical illustration of single components of a construction kit, from which an airbag device for protecting the head of a vehicle occupant can be combined;

FIG. 13 shows an example of an airbag device combined from components according to FIG. 12;

FIG. 15b shows an airbag device serving as a head protection out of the components of FIG. 15a;

FIG. 16b shows an airbag device serving as a head protection out of the components of FIG. 16a;

FIG. 18a shows a modification of the arrangement shown in FIG. 17a;

FIG. 31a, 31b show a second embodiment of a wound protection layer for protecting the fabric of a connection channel of the airbag device against hot gases streaming out of a gas generator;

FIG. 32a-32c show a receptacle for the gas generator being oval in cross section and serving as a gas stream distributor at the same time;

FIG. 33 shows a cross section through a connection channel of an airbag device having a fabric hose held therein having a heat resistant material layer.

DESCRIPTION

Figure 1:
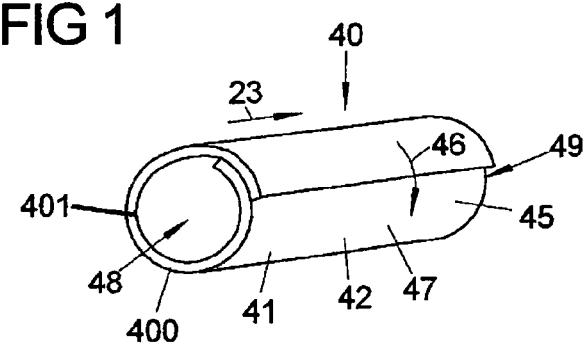
FIG. 1 shows a schematical perspective view of a sealing means of an airbag module according to the invention.

An embodiment of the present invention relates to an airbag module. According thereto, the sealing means is arranged between the boundary region and the gas generator inserted into insertion opening in a way, that upon inflation of the airbag the sealing means is pressed against said boundary region of the insertion opening due to the gas flowing out of the gas generator in order to seal said insertion opening (self-actuating seal).

The solution according to the invention allows for inserting the gas generator into the insertion opening or the sealing means in a way that an ignition plug can be plugged subsequently into a connection side of the gas generator protruding out of the interior space of the airbag. Furthermore, the solution according to the invention allows for inserting the gas generator into the pre-assembled module or airbag in a simple manner and for exactly positioning the gas generator thereby.

Particularly, the sealing means is pressed against the boundary region of said insertion opening with a middle region of the sealing means circulating the gas generator along the boundary region of the insertion opening.

Particularly, the gas generator is inserted into the insertion opening along an insertion direction, wherein the circulating middle portion of the sealing means is particularly designed for widening in a cross section plane oriented perpendicular to the insertion direction or runs parallel to the opening plane of the insertion opening. Thereby, the sealing means is particularly designed for widening when the gas provided by the gas generator hits the middle section and pushes the latter outwards away from the gas generator and thereby sealingly presses it against the circulating boundary region of the insertion opening of the airbag covering.

For exhausting the gas provided by the gas generator, the gas generator particularly comprises at least one outflow opening, wherein the middle portion is particularly arranged such with respect to said at least one outflow opening, that said middle portion faces said at least one outflow opening, or that gas flowing out of the outflow opening hits the middle portion, whereby said widening of the middle portion in said cross section plane takes places.

In order to sealingly fix the sealing means at the gas generator, a clamping element encompassing the sealing element is provided, by means of which the sealing means is particularly fixed at the gas generator outside the interior space of the airbag. Here, it can be a usual clamping ring.

Particularly, the sealing means comprises a first end portion connected to the middle portion of the sealing means, which is particularly integrally formed with said middle portion of the sealing element. Thereby, the clamping element is particularly arranged and provided to press the first end portion of the sealing means against the gas generator, so that the sealing means tightly butts with said first end portion of the sealing means against the gas generator (particularly outside the interior space of the airbag).

Particularly, the sealing means is produced out of at least one flexible material layer, wherein said material layer is an airbag material in particular, out of which also the airbag covering can be produced.

Particularly, the material layer is wound up along a winding direction (sealing sleeve), so that the material layer forms a circulating wall of the sealing means, which on its part defines a receptacle for the gas generator. Particularly, the material layer is wound up along the winding direction in a way that the middle portion of the resulting sealing means circulates along the winding direction. Particularly, the material layer is wound up along the winding direction, so that it furthermore overlaps in sections, i.e. the wall comprises at least in sections two regions of the material layer (extending along the insertion region) lying on top of each other, so that the middle portion can widen in cross section when gas flowing out of the gas generator acts upon the middle portion of the sealing means encompassing the gas generator. Since the material layer overlaps along the winding direction and the overlapping regions are not connected to each other along the whole length of the sealing means, the middle portion of the material layer widens when gas hits this portion, because said overlapping regions can glide along each other corresponding to the forces introduced into the middle portion (namely in opposite directions). Furthermore, due to the gas hitting the middle portion, the distance between the overlapping regions (layers) is reduced. These two movements of the second portion or rather of the regions (layers) of the material layer lying on top of each other go along with an increase of the cross section of the second portion (so-called film spool effect).

This film spool effect can be controlled by means of the number of regions of the material layer lying on top of each other. In particular, it is provided that the wall comprises along its whole periphery extending along the winding direction at least two layers lying on top of each other. Particularly, at least two layers but at most four layers are provided. It is however also conceivable to provide more than four layers. Particularly, more than 2¼ layers are provided, i.e. two completely circulating layers as well as an additional overlap of a quarter layer that covers a quarter of the periphery of the sealing means along the winding direction.

Particularly, the winding direction runs across the insertion direction along which the gas generator is inserted into the insertion opening oriented perpendicular to the insertion direction.

In order that the wound-up state of the material layer, out of which the sealing means is formed, can be maintained enduringly, layers of the material layer forming the wall of the sealing means and lying on top of each other are connected to each other in the region of the first end portion of the sealing means and/or in the region of the second end portion of the sealing means in a way (particularly by means of a through-seam that pierces said layers of the wall lying on top of each other), that the respective end portions cannot unwind or widen in cross section or widen less in cross section than the middle portion. In particular a negligible widening of the end portions in cross section can be produced by a shearing or stretching of said connection (through-seam) of the layers lying on top of each other. However, since no such connection of layers of the material layer forming the wall and lying on top of each other is provided in the middle portion, the middle portion can still widen or widen stronger according to the film spool effect (see above) when gas leaving the gas generator acts upon this middle portion and pushes it outwards against the boundary region delimiting the insertion opening of the airbag.

Particularly, the first end portion of the sealing means is connected to the second end portion of the sealing means via the middle portion of the sealing means, wherein said second end portion is particularly arranged inside the interior space of the airbag and is particularly formed integrally with the middle portion. Particularly, the sealing element is fixed at the airbag covering via the second end portion being arranged inside the airbag covering or inside the interior space of the airbag, particularly by means of a seam.

In a variant of the invention, a diffuser is provided that is particularly fixed at the second end portion, wherein said diffuser is particularly formed integrally with the second end portion of the sealing means. Particularly, the sealing means is fastened to the airbag covering of the airbag via said diffuser. The diffuser serves for distributing (guiding) of the gas provided by the gas generator.

Particularly, the material layer, out of which also the diffuser can be formed, consists of an airbag material, particularly a fabric, out of which also the airbag covering can be produced.

The gas generator serving for inflating the airbag particularly extends longitudinally along an extension direction, wherein said gas generator is formed as a tubular gas generator in particular. Extending longitudinally thereby means that said object comprises a larger dimension along said extension direction than across said extension direction.

Particularly, said extension direction coincides with the insertion direction, i.e. in case of a gas generator in the form of a tubular gas generator the latter is inserted into the insertion opening of the airbag covering with a face side ahead.

Particularly, the gas generator is introduced through the insertion opening into the interior space of the airbag in a way that the gas generator protrudes with a free end portion out of the interior space of the airbag for connecting the gas generator to an electronics on the vehicle side by means of which the gas generator can be activated, wherein a corresponding contact unit for electrically connecting the gas generator to said electronics on the vehicle side is provided at said free end portion of the gas generator.

In order to ease the insertion of the gas generator into the insertion opening of the airbag covering along the insertion direction, the first end portion of the sealing means is particularly formed funnel-shaped or comprises guiding elements, that guide or position the gas generator upon contriving it into the sealing means. Advantageously, said sealing means is therefore inserted into the insertion opening at first, so that the first end portion of the sealing means, which is particularly formed funnel-shaped, protrudes out of said airbag covering and faces with its first end portion the gas generator that is to be inserted. The gas generator is then (with its face side ahead) inserted into the (funnel-shaped) first end portion of the sealing means and thereby positioned at the same time in a plane running across the insertion direction. The gas generator is thereby inserted into the interior space of the airbag thus far, that gas flowing out of the gas generator can hit the middle portion of the sealing means and that the boundary region delimiting the insertion opening encompasses the gas generator in cross section.

In a variant of the invention, the airbag covering consists of at least two airbag parts, which—with respect to a flatly outspread state of the airbag covering in which the two airbag parts lie on top of each other flatly outspread—are integrally formed with each other along an outermost boundary portion of the airbag covering extending along the insertion direction (so-called butterfly-layout). I.e. the two airbag parts are folded onto each other along a folding axis that runs along said boundary portion and the boundary portions of the two airbag parts that are not yet connected to each other are then connected to each other forming the airbag covering, wherein said connection is particularly formed by a seam.

Thereby, in a variant of the invention, said insertion opening for the gas generator (and the sealing means) is formed by a cut across said boundary region running along the insertion direction that divides the boundary portion into a first and a second portion, wherein the first portion is folded in towards the interior space of the airbag, so that the boundary region of the insertion opening of the airbag covering is formed by the boundaries of the cut facing each other after cutting the boundary portion, wherein the folded-in first portion forms a receptacle being u-shaped in cross section for the gas generator, which under interposition of the sealing means butts against the gas generator, so that said folded-in first portion encompasses the gas generator across the insertion direction at least in sections.

Particularly, for retaining the gas generator, a loop being fixed at the airbag covering is provided that faces the insertion opening along the insertion direction, wherein said loop annularly encompasses together with the folded-in first portion the gas generator as well as the sealing means in a plane running perpendicular to the insertion direction. Thereby, the loop and said folded-in first portion face each other across the insertion direction, wherein the loop butts against an upper side of the gas generator facing away from the interior space of the airbag and the folded-in first portion butts against a lower side of the gas generator facing the interior space of the airbag.

Furthermore, the problem according to the invention is solved by a method for producing an airbag, particularly according to one of the claims 1 to 31, wherein the method according to the invention comprises the steps of:

providing an airbag covering of the airbag that surrounds an interior space of the airbag that can be filled with gas in order to inflate the airbag;

inserting a sealing means into the insertion opening, so that the sealing means butts against a boundary region of the insertion opening delimiting the insertion opening via a middle portion of the sealing means; and inserting the gas generator into the sealing means, such that gas that is to be provided by the gas generator can get into the interior space of the airbag and that the boundary region delimiting the insertion opening annularly encompasses the gas generator under interposition of the middle portion of the sealing means, so that gas hitting the middle portion presses the middle portion against said boundary region for sealing the insertion opening.

For forming the sealing means, a flat material layer is particularly provided, this one is particularly wound such along a winding direction for forming the sealing means, that at least two layers of the material layer overlap along the winding direction, and said sealing means (material layer) is inserted such into the insertion opening along an insertion direction oriented across the winding direction, that said boundary region of the insertion opening annularly encompasses the middle section of the sealing means. The material layer is particularly wound up along the winding direction in a way that the sealing means comprises a first and a second boundary portion which are connected to each other via the middle portion, namely integrally formed with each other. Thereby, portions of the material layer lying on top of each other at the first and/or the second boundary portion are particularly fastened to each other in a way, that the sealing means cannot unwind in the region of the respective boundary portions or widen in cross section or that a widening of the end portions in cross section turns out smaller than the widening of the middle portion of the sealing means.

Particularly, the gas generator is arranged with respect to the middle portion of the sealing means in a way, that the middle portion faces at least one outflow opening of the gas generator or that gas leaving the gas generator can hit the middle portion and act on the latter with a pressure, so that the middle portion is forced towards the boundary portion of the insertion opening circulating the gas generator and can sealingly abut on this boundary region.

Figure 4:
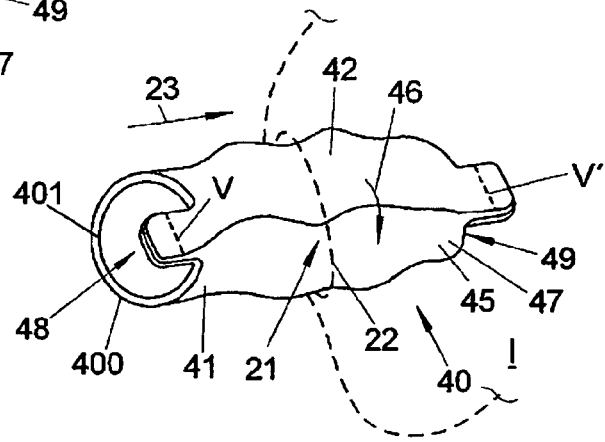

FIG. 1 shows a sealing means 40 of an airbag module according to the invention that is arranged and provided for sealing an insertion opening 21 of an airbag covering 20 of an airbag 10, wherein said insertion opening 21 of the airbag covering 20 of the airbag 10 serves for inserting a gas generator 30 into an interior space I of the airbag 10 defined by the airbag covering 20 (compare FIGS. 4 and 6), wherein said gas generator 30 is inserted into the insertion opening along an insertion direction 23.

The sealing means 40 consists of a flexible material layer 45 that can be formed out of an airbag material out of which also the airbag covering 20 of the airbag 10 can be produced in particular. This material layer 45 is wound up starting from a flatly outspread state along a winding direction 46, so that a particularly hollow cylindrically shaped wall 47 of the sealing means 40 is formed that defines a receptacle for the gas generator 30. Thereby, the material layer 45 is particularly wound up along the winding direction 46 in a way, that the material layer 45 overlaps along the winding direction, namely particularly such, that the wall 47 of the sealing means 40 always comprises along its periphery 49 circulating along the winding direction 46 two layers 400, 401 of the material layer lying on top of each other. The wall 47 of the sealing means 40 is therefore particularly designed two-layered. The wall 47 furthermore extends longitudinally along said insertion direction 23 and circulates across said insertion direction 23, so that the receptacle 48 of the sealing means 44 aligns with the insertion opening 21 along the insertion direction 23 upon insertion of the sealing means 44 into the insertion opening 21.

The sealing means 40 is divided along said insertion direction 23 into three portions, namely into a first end portion 41 and a second end portion 23 which faces the first end portion 41 along the insertion direction 23, wherein the two end portions 41, 43 are connected to each other via a middle portion 42 of the sealing means 40. Along said insertion direction 23 the sealing means 40 is inserted according to FIG. 4 into the insertion opening 21 of the airbag covering 20 into the interior space I of the airbag 10, so that a boundary region 22 of the airbag covering 20 delimiting the insertion opening 21 annularly encompasses the middle section 42 of the sealing means 40. Thereby, the second end portion 43 of the sealing means 40 is arranged inside the interior space I of the airbag 10 and the first end portion 41 of the sealing means 40 protrudes along (towards) the insertion direction 23 out of the interior space I of the airbag 10.

Figure 2:
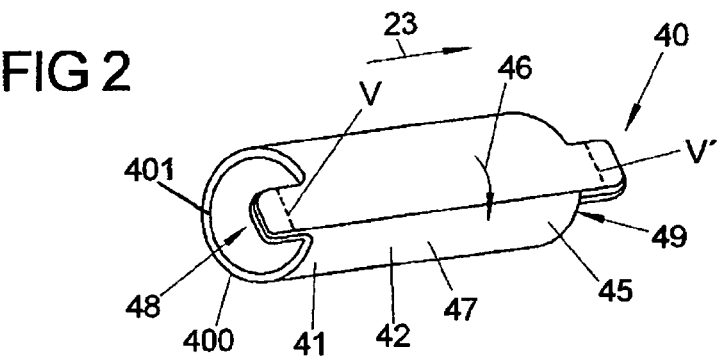
FIG. 2-4 show schematical, perspective views of a modification of the sealing means of an airbag module according to the invention shown in FIG. 1.

According to FIG. 6, a gas generator 46 is inserted along the insertion direction 23 into the receptacle 48 of the sealing means 40, which in particular is a tubular gas generator 30 extending longitudinally along an extension direction E. Thereby, the extension direction E of the tubular gas generator 30 coincides with the insertion direction 23. The gas generator 30 is now inserted along the insertion direction 23 into the receptacle 48 of the sealing means 40 in a way, that outflow openings 31 formed at the gas generator 31 through which gas can flow out of the gas generator 30, are surrounded by the sealing means 40 in a plane extending perpendicular to the insertion direction 23, or in other words, said outflow openings 31 are arranged in the receptacle 48 of the sealing means 40. In case the gas generator now provides gas for inflating the airbag 10, the gases leaving the outflow openings 31 act on the middle portion 42 of the sealing means 40 along directions running across the insertion direction 23, so that the middle portion 42 is pressed particularly sealingly against the boundary region 22 of the insertion opening 21 encompassing the middle portion 42. Since the sealing means 40 and particularly the middle portion 42 of the sealing means 40 consists of a wound material layer 45, the cross section of the middle portion 42 is able to widen in said plane running perpendicular to the insertion direction 23. This is based on the fact that the layers 400, 401 of the material layer 45 merely butt against each other and are not fastened to each other. In case the middle portion 42 of the sealing means 40 is therefore acted on with a pressure from the direction of the receptacle 48 (gas leaving the gas generator), the layers 400, 401 glide along each other in opposite directions, namely under widening of said cross section of the middle portion 42 (so-called film spool effect, compare FIG. 2).

Figure 3:
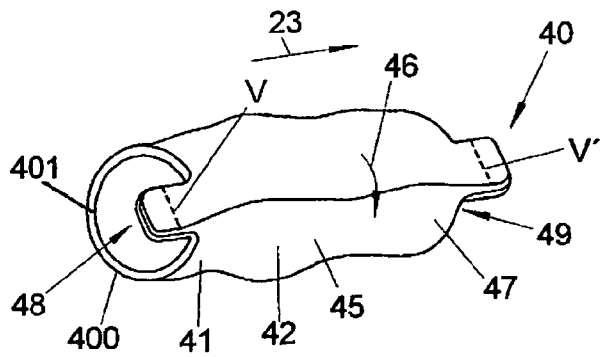

In order that the wound-up state of the material layer 45 can be maintained, the layers 400, 401 the sealing means 40 are fixed to each other at least at the first end portion 41 of the sealing means 40 by means of an connection V (particularly a seam). Particularly, such a connection V' is also provided at the second end portion 43 of the sealing means 40 (compare FIGS. 3 to 4). Thus, the sealing means 40 can only widen in the region of the insertion opening 21 in cross section, wherein it particularly sealingly abuts on the boundary region 22 of the insertion opening 21 of the airbag covering 20. Said sealing means 40 is thus formed self-sealing.

In order to ease insertion of the gas generator 30 along the insertion direction 23 or rather along the extension direction E into the receptacle 48 of the sealing means 40, the first end portion 41 of the sealing means 40 of the variant shown in FIG. 6 is formed funnel-shaped or comprises two guiding elements 48a and 48b that face each other across the insertion direction 23 and diverge opposite to the insertion direction 23, so that an opening of the receptacle 48 of the sealing means 40 facing the gas generator 40 is effectively enlarged. Upon insertion of the gas generator 30 into said opening of the receptacle 48 of the first end portion 41 of the sealing means 40, the gas generator 30 is thus guided by said guiding elements 48a, 48b and thereby positioned across the insertion direction 23 upon insertion into the receptacle 48 or the insertion opening 21 of the airbag covering 20.

The sealing means according to FIGS. 1 to 4 is particularly fixed at the airbag covering 20 via the second end portion 43 of the sealing means 40 inserted into the interior space I of the airbag 10, namely particularly by means of a seam connection.

Figure 5:
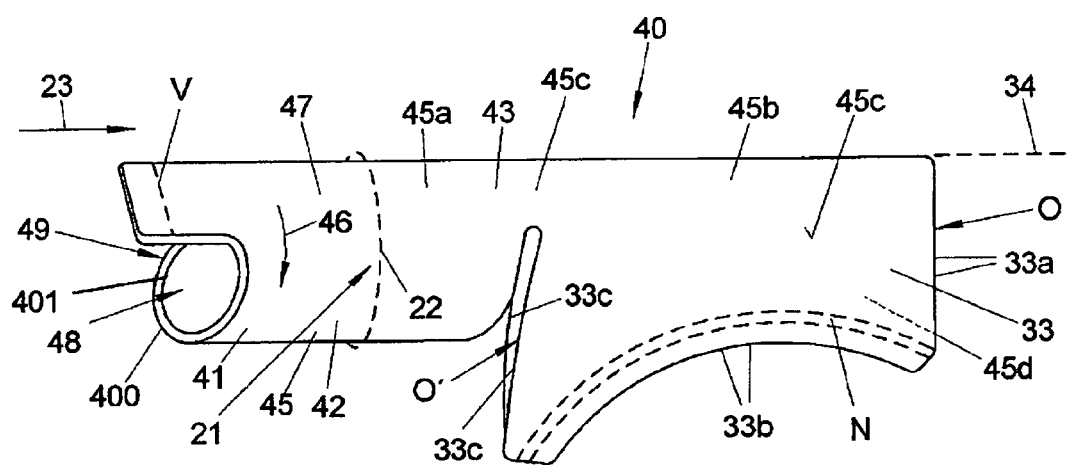
FIG. 5 shows a further modification of a sealing means of an airbag module according to the invention.
Figure 10:
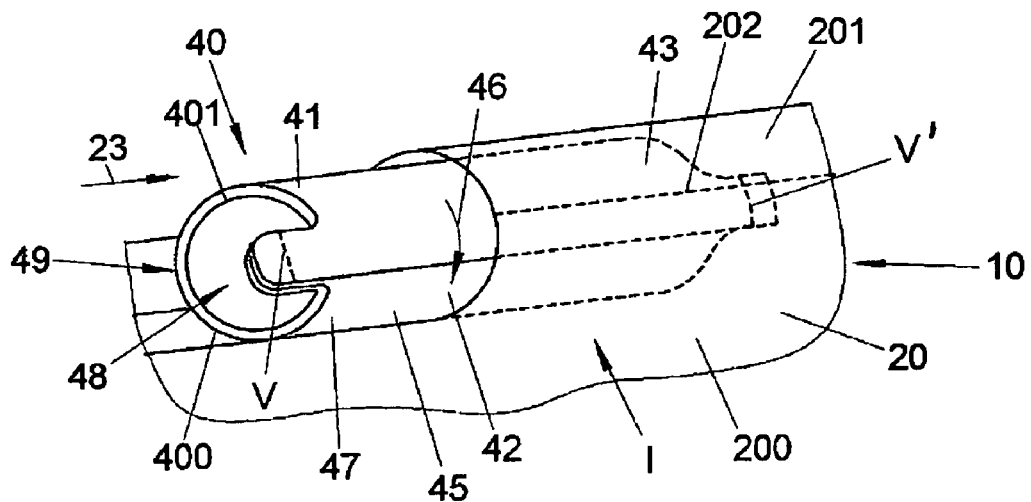

The FIG. 5 shows a modification of the sealing means 40 shown in FIGS. 1 to 4 in case of which in contrast to FIGS. 1 to 4 a diffuser 33 is integrally formed on the second end portion 43 of the sealing means 40, which serves for distributing gases set free by the gas generator 30 into the interior space I of the airbag 10.

For forming this uniform component, a first part 45a of the material layer 45 is wound up as described above (compare FIGS. 1 to 4). Said first part 45a of the material layer 45 is thereby integrally formed on a second part 45b of the material layer 45 via a material bridge 45c, which in contrast to the first part 45a of the material layer 45 is not wound up, but congruently folded on top of one another along a fold axis 34 oriented along the insertion direction 23, so that said second part 45b of the material layer 45 is divided into two diffuser parts 45c, 45d folded congruently onto each other. These two diffuser parts 45c, 45d each comprise a boundary portion 33b facing the folding axis 34 across the insertion direction 23, wherein the two diffuser parts 45c, 45d are connected to each other along this boundary portion 33b by means of a connection N (particularly a seam). Furthermore, the two diffuser parts 45c, 45d each comprise two boundary portions 33c, 33a which face each other along the insertion direction 23 and come off the boundary region 33b, respectively. Along these boundary portions 33a, 33c the two diffuser parts 45c, 45d are not connected to each other, so that these boundary portions 33a, 33c define or delimit a first opening O and a second opening O' of the diffuser 33 that face each other along the insertion direction 23. The diffuser 33 is therefore able to divide a gas flow leaving the gas generator 30 into two gas flows which leave the diffuser 33 through the first opening O and the second opening O', respectively, in opposite directions. In order that the two diffuser parts 45c, 45d can be simply folded onto each other along the folding axis 34, the material bridge 45c is formed small compared to the extension of the part 45 along the winding direction 46 or the extension of the diffuser parts 45c, 45d across the insertion direction 23 (with respect to a flatly outspread state of the two parts 45a, 45b of the material layer 45).

The afore-described sealing means 40 or diffuser 33 is especially suitable for an application in a side airbag or head side airbag, in case of which a gas flow leaving the gas generator 30 has to be distributed over at least two chambers. Thereby, one of the two chambers is connected in a gas conducting manner to the first opening O of the diffuser 33 and the other chamber to the second opening O' of the diffuser 33.

FIG. 7 shows in conjunction with FIGS. 8 to 11 a variant of an insertion opening 21 of an airbag module according to the invention, which is particularly suited for an airbag 10 having a so-called butterfly-layout. Here, the airbag 10 comprises two airbag layers 200, 201 integrally formed with each other, which are congruently folded onto each other along a folding axis 34, that extends along said integral connection of the two airbag parts, so that a boundary portion 202 of the airbag covering 20 extending along the insertion direction 23 results via which said airbag parts 200, 201 are integrally formed with each other. For forming the airbag covering 20 said two airbag parts 200, 201 are connected to each other along their outermost boundaries.

In order to form an insertion opening 21 at such an airbag, the boundary portion 202 of the airbag covering 20 extending along the insertion direction 23 is cut in across the insertion direction 23, so that it comprises a cut 210 extending across the insertion direction 23.

This cut 210 thereby divides the boundary portion 202 of the airbag covering 20 into a first portion 202a and a second portion 202b which face each other along the insertion direction 23. Thereby, the first portion 202a is now folded in across the insertion direction 23 towards the interior space I of the airbag 10, so that the cut 210 according to FIGS. 8 and 9 forms a circulating boundary region 22 of an insertion opening 21 of the airbag covering 20. Furthermore, the folded-in first portion 202a of the boundary portion 202 of the airbag covering 20 thereby forms a receptacle being particularly u-shaped in cross section that is provided for receiving the gas generator 30.

Now, a sealing means 40 can be inserted into or arranged in the insertion opening 21 along the insertion direction 23 according to FIG. 1 to 4 or 5. This sealing means 40 is then particularly fixed at the airbag covering 20 via the second end portion 43 of the sealing means or via the diffuser 33 being integrally formed thereon, namely particularly at the second (not folded-in) portion 202b of the boundary portion 202 of the airbag covering 20 extending along the extension direction E or insertion direction 23.

Figure 11:
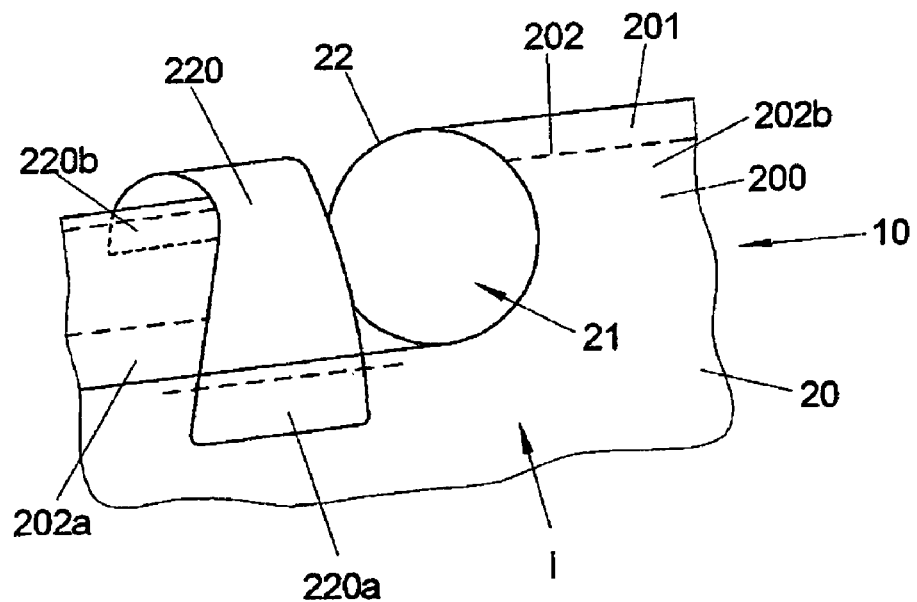

In order to retain the gas generator 30 including the sealing means 40 in the receptacle formed by the folded-in first portion 202a, a loop 220 is provided (compare FIG. 11). Said loop 220 comprises two opposing free end portions 220a, 220b, via which said loop 220 is fixed at the airbag covering 20, so that it faces the insertion opening 21 of the airbag covering 20 along the insertion direction 23 and annularly encompasses together with the folded-in first portion 202a the gas generator 30 and the sealing means 40. Hereby, the gas generator 30 is securely fixed at the airbag covering 20 with respect to the insertion opening 21.

FIG. 12 shows a construction kit of components that can be used for producing an airbag device in the form of a head protection device for a vehicle occupant.

Under i) material layers or material parts (airbag layers/airbag parts) of different size and geometry are thereby illustrated, which can serve for producing an inflatable region of the airbag device, which forms a gas cushion in the inflated state. The airbag layers can be fabric layers in particular. Due to the essentially rectangular section of the airbag layers, the latter can be stamped out of a material web, like for instance a fabric roll, with minimal cutting scrap.

After ii) different further material or fabric layers are illustrated which can serve for forming connection channels via which neighboring inflatable regions of an airbag arrangement can be (flow-) connected.

Under iii) several tension bands are finally illustrated which can serve for tensioning the airbag device and which, for this, engage for instance with different elements of the airbag device and/or with a vehicle structure.

Figure portion iv) finally shows several fastening flaps which can be used for fastening an airbag device to a motor vehicle structure.

From the components in the form of material layers for inflatable airbag regions and for connection channels between inflatable airbag regions as well as in the form of tension bands and fastening flaps depicted in FIG. 12, those are respectively selected for producing a certain airbag device who fulfill the requirements for a certain airbag device—for instance depending on the vehicle type in which the airbag device shall be employed.

FIG. 13 shows an airbag device in the form of a head protection device which is combined out of components of the kind shown in FIG. 12, wherein said components are connected to each other, for instance by means of sewing and/or by sticking them together, in order to form a uniform airbag device.

According to FIG. 13 the resulting airbag device comprises two inflatable regions $1a$, $1b$, which—related to the state in which the airbag device is built into a motor vehicle—are spaced apart along the longitudinal vehicle axis x and stand in flow communication with each other via a connection channel 2. The inflatable regions $1a$, $1b$ as well as the connection channel 2 of the airbag device are thereby formed by material layers of the kind shown in FIG. 12 under i) and ii).

Further, fastening flaps 4 protrude from the inflatable regions $1a$, $1b$ of the airbag device as well as from their connection channel 2, which are separate elements with respect to the inflatable regions $1a$, $1b$ and the connection channel 2, which can be fixed in a suitable manner—as will be described in more detail below—to said components $1a$, $1b$, 2 of the airbag device. Finally, several tension bands 3 are provided, one of which serves for connecting the two inflatable regions $1a$, $1b$ of the airbag device and two further of which are provided for connecting each of the inflatable regions $1a$, $1b$ of the airbag device to a vehicle structure, in order to be able to tension the airbag device in the inflated state with respect to the vehicle structure and to hereby achieve optimal conditions for intercepting a vehicle occupant in case of a crash.

The airbag device shown in FIG. 13 is formed out of a construction kit of pre-assembled components, which are on the one hand material layers (fabric layers) for forming inflatable regions $1a$, $1b$ as well as connection channels 2 of the airbag device. Furthermore, as components separate thereof, the fastening flaps 4 and the tension bands 3 are constituent parts of the construction kit serving for producing the airbag device shown in FIG. 13.

By means of FIG. 13 it becomes further clear that the two inflatable regions $1a$, $1b$ of the airbag device extend along the vertical vehicle axis z over a larger extension than the connection channel 2 lying in between said two inflatable regions $1a$, $1b$. Hereby, the two inflatable regions $1a$, $1b$ of the airbag device each form a large-area gas cushion for protecting a vehicle occupant in case of a crash, by means of which particularly at least a lateral window pane of a motor vehicle can be covered to a large extent. The connection channel 2 comprises in contrast thereto a significantly smaller extension along the vertical vehicle axis z. Connection channels 2 are therefore—related to a state of the airbag device in which the latter is built into a motor vehicle—advantageously positioned at locations, at which an impact of a vehicle occupant is not to be expected.

Besides, parts of the lateral structure of a motor vehicle are indicated in FIG. 13, namely two lateral window panes Fa, Fb as well as an A-, B- and C-pillar, by means of dashed lines, which are (partly) covered by the airbag device. Thereby, the inflatable regions $1a$, $1b$ of the airbag device cover those parts of the lateral body structure, i.e. of the window pane Fa, Fb as well as the A-, B- and C-pillar, with which the head of a vehicle occupant can collide in case of a crash.

Precisely, the two inflatable regions $1a$, $1b$ of the airbag device formed as, with respect to each other, separate, inflatable elements, each consist according to FIG. 13 out of two material or fabric layers of the kind shown in FIG. 12 under i), which are for instance connected to each other (e.g. by means of seams) in the way, that they each define an inflatable region of the airbag device that can be filled with gas, wherein one of the material layers faces the lateral vehicle structure, i.e. the window panes Fa, Fb as well as the structure forming pillars A, B, C, and the other opposing material layer faces the vehicle interior space, i.e. particularly a vehicle occupant that is to be protected.

Figure 14:
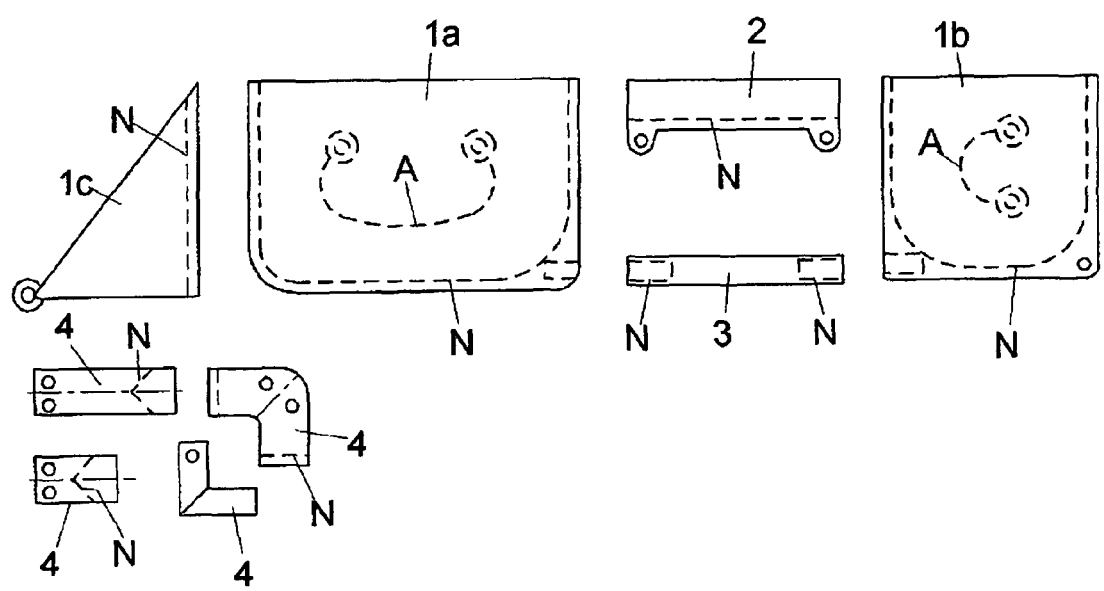
FIG. 14 shows a detailed illustration of components of an airbag device, which can be combined for forming a head protection device.

FIG. 14 shows an arrangement according to FIG. 13 in a more detailed illustration. Here, seams N can be recognized at the inflatable elements forming the airbag regions $1a$, $1b$ as well as at the connection channel 2, a tension band 3 and at the fastening flaps 4, that serve for fastening the individual components $1a$, $1b$, 2, 3, 4 of the airbag device to each other.

Thereby, the seams N at the inflatable regions $1a$, $1b$ as well as at the connection channel 2, also serve for connecting material or fabric layers to each other, out of which the respective inflatable region $1a$, $1b$ or the connection channel 2 consists. Typically, these are two fabric layers, one of which—related to a state of the airbag device in which the latter is built into a motor vehicle—faces the lateral body structure of a motor vehicle, i.e. particularly a window pane and/or one of the structure forming pillars, and the other one of which faces the vehicle interior space and therewith in particular the head of a vehicle occupant that is to be protected.

Furthermore, tucks A are recognizable in FIG. 14, along which the two material or fabric layers which form the inflatable regions $1a$, $1b$ of the airbag device, are connected to each other, in order to form constrictions. Hereby, the respective inflatable region $1a$, $1b$ is structured such in the inflated state that an optimal protection of a vehicle occupant is assured.

Furthermore, according to FIG. 14 an additional (third, non-inflatable) region $1c$ (in the form of a sail) is provided, which is formed out of triangle-shaped material or fabric layouts and is therefore particularly suited for covering a triangle window of a motor vehicle.

Figure 15A:
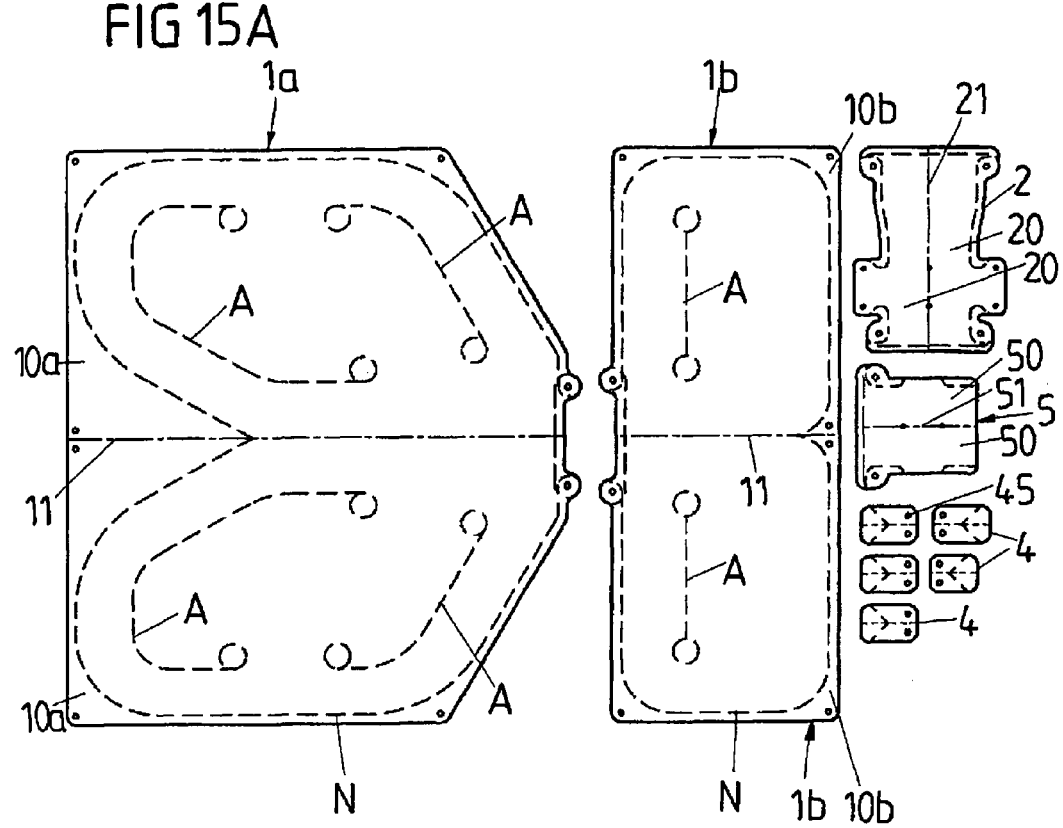
FIG. 15a shows a third embodiment of components of an airbag device, which can be combined to form a head protection device.
Figure 16A:
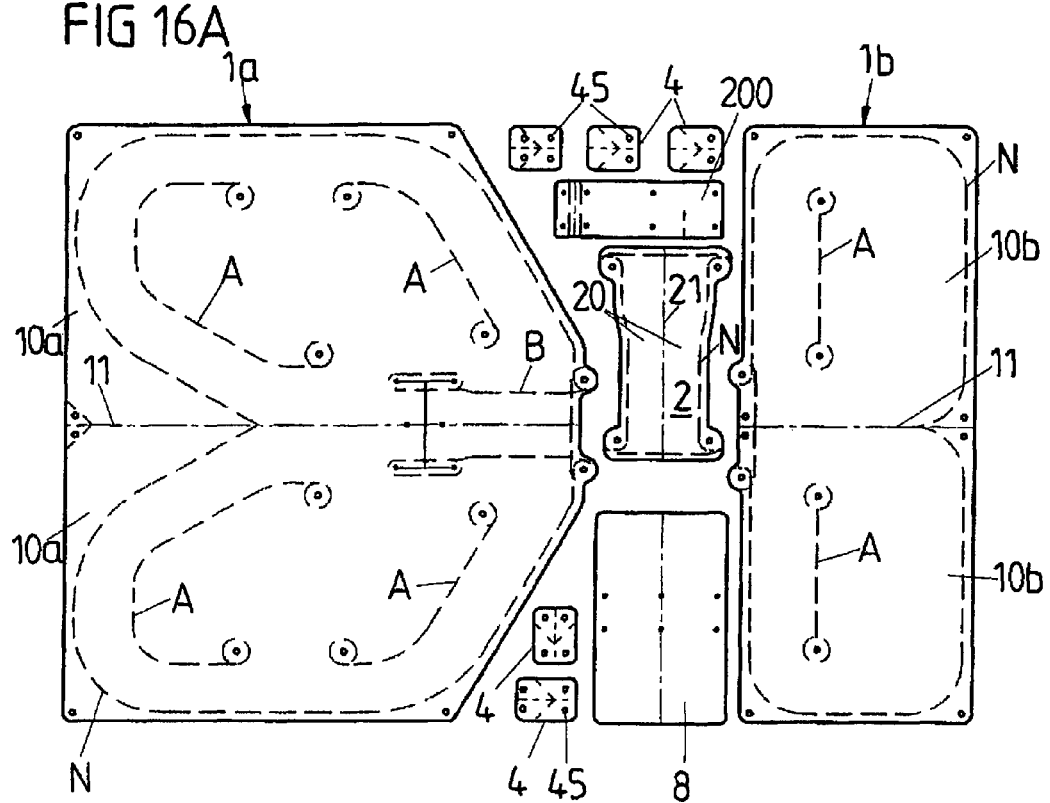
FIG. 16a shows a fourth embodiment of components of an airbag device, which can be combined to form a head protection device.

In such Figures, in which the components of the airbag device are shown in a non-joined state, like for instance in the afore-described FIG. 14, the FIG. 15a and the FIG. 16a, tucks A and seams N shown there respectively point to those locations at which after joining the individual components of the airbag device the corresponding tucks A and seams N will reside. The latter are not yet present at the individual components of the airbag device in the state shown in the FIGS. 14, 15a and 16a.

Figure 15B:
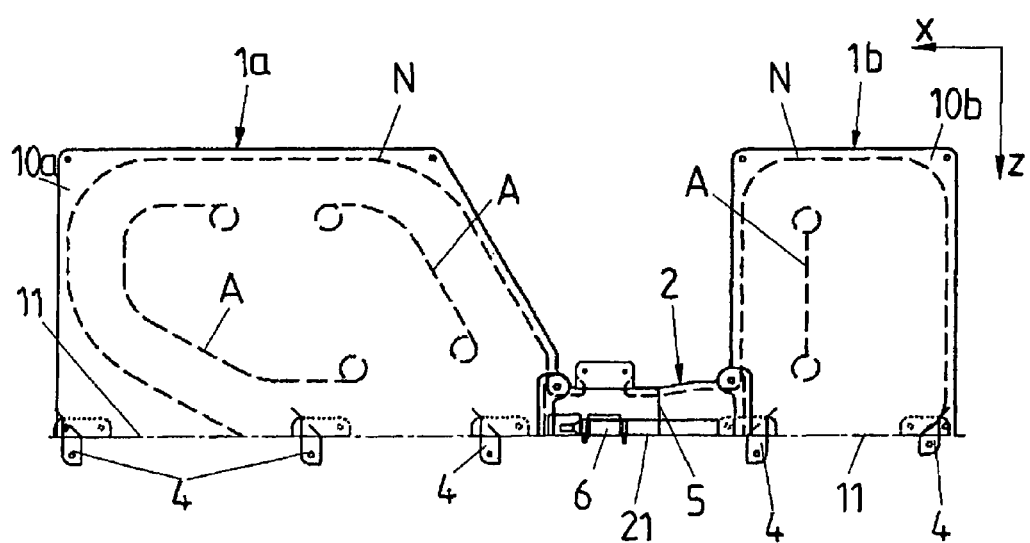

In the FIGS. 15a and 15b a further embodiment of an airbag device serving as a head protection is shown, wherein in FIG. 15a the constituent parts of said airbag device are individually shown and FIG. 15b shows the airbag device in the assembled state.

A particularity of the arrangement shown in the FIGS. 15a and 15b is that one-piece material layouts (particularly one-piece fabric layouts), which form inflatable airbag regions 1a, 1b, a connection channel 2 between said airbag regions 1a, 1b as well as a receptacle 5 for a gas generator 6, are respectively accomplished to form a butterfly-design. This means, that the individual layouts respectively comprise two material layers or, more precisely, fabric layers 10a, 10b, 20 or 50, which are essentially identically designed, namely mirror-symmetrically with respect to a symmetry axis 11, 21 or 51, along which the two layers 10a, 10b, 20, 50 are connected to each other. The two material layers thus quasi form the wings of a butterfly in the respective material layout, which are integrally formed with each other along the respective symmetry axis 11, 21, 51.

Also fastening flaps 4 that are provided for fastening the airbag device to a vehicle structure, particularly in the roof edge region, are formed mirror-symmetrically here. Further details of said fastening flaps 4 respectively comprising at least one fastening opening 45 will be described by means of the FIGS. 21a to 26b below.

As becomes clear by means of FIG. 15b, a gas generator 6, which serves for inflating the two inflatable regions 1a, 1b spaced apart along the longitudinal vehicle axis x, is arranged here in the connection channel 2 using a flexible receptacle 5, which connects the two inflatable regions 1a, 1b in a gas conducting manner. Details for arranging a gas generator 6 in the airbag device, particularly in the connection channel 2 of the airbag device, are shown in the FIGS. 27 to 33 and will be explained below by means of the latter.

As can be seen by means of a synopsis of FIGS. 15a and 15b, the material or fabric layouts forming the inflatable regions 1a, 1b as well as the connection channel 2 are reverted once about their respective symmetry axis as folding line 11 or 21, respectively, and are afterwards sewn to each other along their outer boundary forming seams N, so that two inflatable regions 1a, 1b as well as connection channel 2 (flow-) connecting said inflatable regions result.

The symmetry axes or folding lines 11, 21 thereby extend along the lateral roof edge DK, compare FIG. 13, of a motor vehicle, in case the airbag device shown in the FIGS. 15a and 15b is built into such a motor vehicle. Correspondingly, the fastening flaps 4 are fixed (in a manner described in more detail by means of the FIGS. 21a to 26b below) in the region of said symmetry axes or fold lines 11, 21 to the inflatable regions 1a, 1b as well as, as the case may be, to the connection channel 2, via which fastening flaps 4 a fastening of the airbag device to the motor vehicle, particularly to a lateral roof edge region of a motor vehicle, takes place.

Figure 16B:
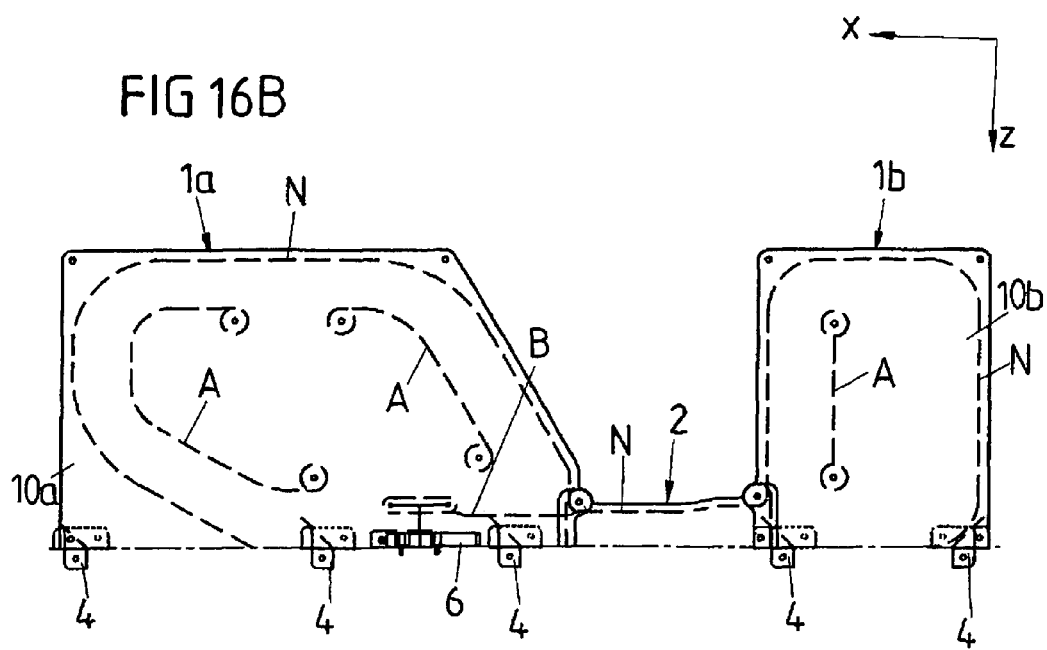

In the FIGS. 16a and 16b a modification of the embodiment of the FIGS. 15a and 15b is shown, wherein the essential difference lies in the fact, that a gas generator 6 serving for inflating the two inflatable regions 1a, 1b spaced apart with respect to each other is not arranged in the connection channel 2, but is arranged in one of the two inflatable regions 1a, 1b. For this, a room for receiving the gas generator 6 is formed in said inflatable region 1a by means of a delimiting seam B.

Furthermore, a protection layer sleeve 8 for the gas generator 6 and a bandage 200, each in an evenly outspread state, can be seen in FIG. 16a, whose function is explained in more detail by means of the FIG. 29a to 31b or 27, respectively, below.

In case of the airbag device shown in the FIGS. 15a and 15b as well as in case of the one shown in FIGS. 16a and 16b, the two inflatable regions 1a, 1b of the airbag device as well as the connection channel 2 can each be produced separately out of a respective material or fabric layout by folding the latter about the axis or folding line provided for this purpose and by subsequently sewing the two resulting opposing material layers 10a, 10b or 20 with each other or connecting them to each other in any other way, so as to create an inflatable airbag region or connection channel, respectively. Thereby, using seams that are as straight as possible is advantageous with respect to production aspects. Afterwards the pre-assembled components of the airbag device are connected to each other, for instance by sewing or in any other manner to be described in more detail in the following.

Figure 17A:
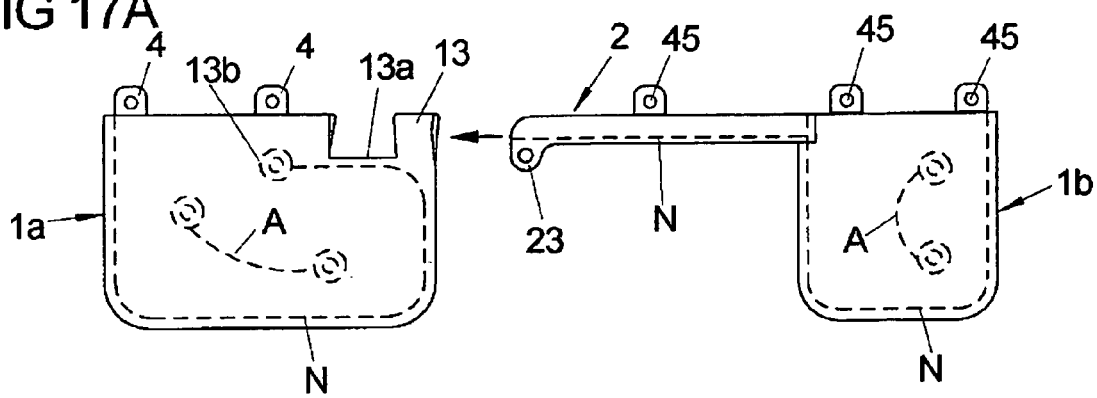
FIG. 17a shows two modules of an airbag device serving as a head protection device, which can be stuck together.

So, FIG. 17a shows an arrangement, in case of which on the one hand a front inflatable region 1a of the airbag device as well as on the other hand a rear inflatable region 1b of the airbag device form a module together with an associated connection channel 2, respectively, which is completely pre-assembled including fastening flaps 4 fixed thereto as well as tucks A for creating constrictions. These two modules are subsequently connected to each other in a form-fit manner in that the connection channel 2 is passed through a loop 13 and a recess 13a of the first inflatable region 1a lying behind and engages with a broadening 23 at its front end with a (ring-shapedly closed) tuck 13b of the first inflatable region 1a provided for this purpose, compare FIG. 17b. The loop 13 at the first inflatable region 1a of the airbag device thereby serves in the completed state for the defined positioning of the connection channel 2 as well as the first inflatable region 1a with respect to each other. Additionally, the first inflatable region 1 and the connection channel 2 can be connected to each other via seams or any other connection means.

Figure 17B:
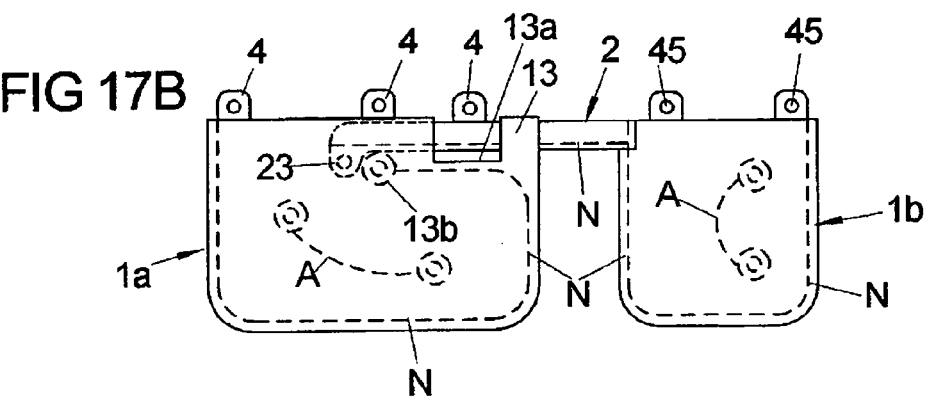
FIG. 17b shows the modules of FIG. 17a in a state in which the latter are stuck together.
Figure 18A:
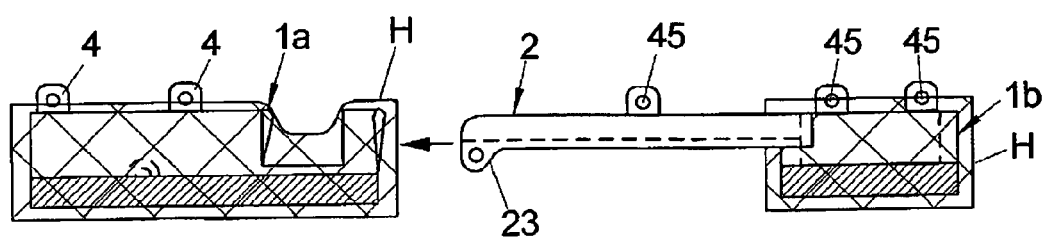
Figure 18B:
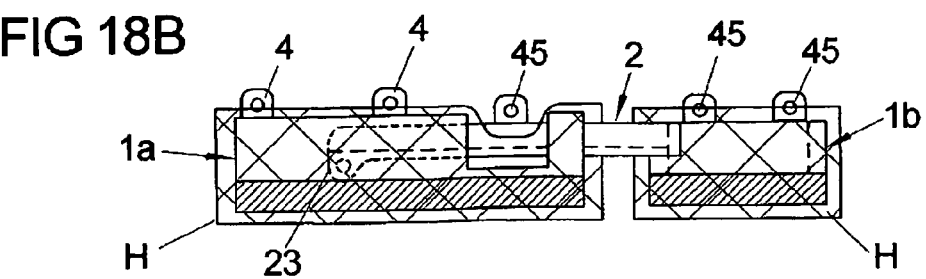
FIG. 18b shows a modification of the arrangement shown in FIG. 17b.

In the FIGS. 18a and 18b a modification of the arrangement of the FIGS. 17a and 17b is shown, wherein the essential difference lies in the fact, that the inflatable regions 1a, 1b of the two modules are each already folded to a (longitudinally) airbag package and are arranged as a folded airbag package in a (hose-like) protection covering H before a connection of the two modules via the connection channel 2 integrated into the second module takes place, compare the transition from FIG. 18a to FIG. 18b.

Figure 19:
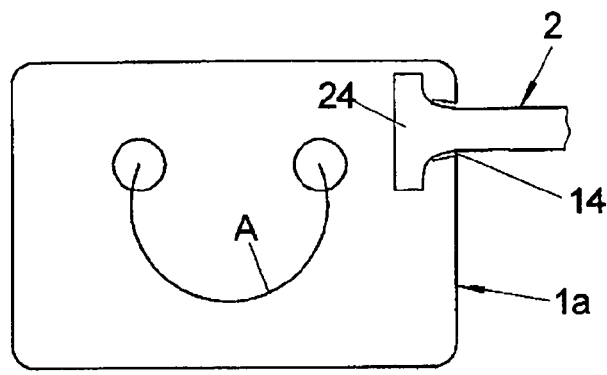
FIG. 19 shows a further example for sticking together two components of an airbag device that can be combined according to a construction kit principle.

Finally, FIG. 19 shows a further possibility for form-fittedly arranging a connection channel 2 at an inflatable region 1a of an airbag device, wherein here the connection channel 2 engages with a broadened end portion 24 with the boundary of a through-opening 14 of the inflatable region 1a, through which said connection channel 2 reaches.

Figure 20A:
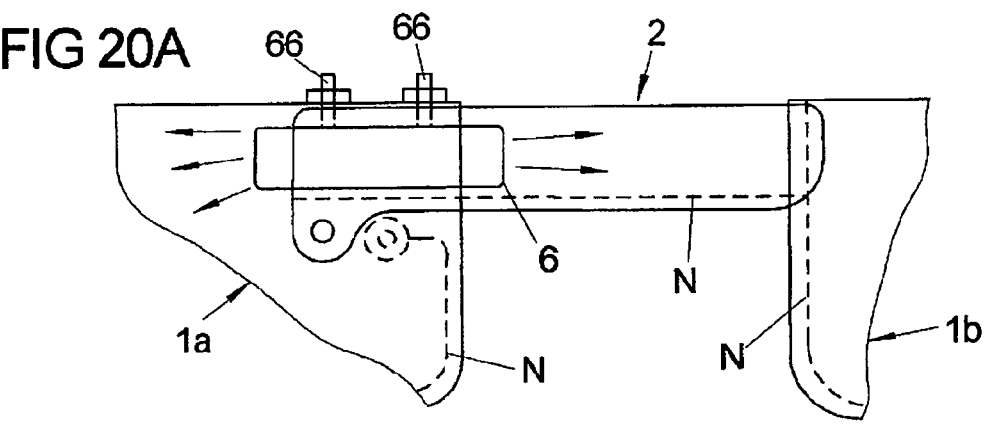
FIG. 20a-20c show three embodiments regarding the use of connections means for assembling components of an airbag device that can be combined according to a construction kit principle.
Figure 20B:
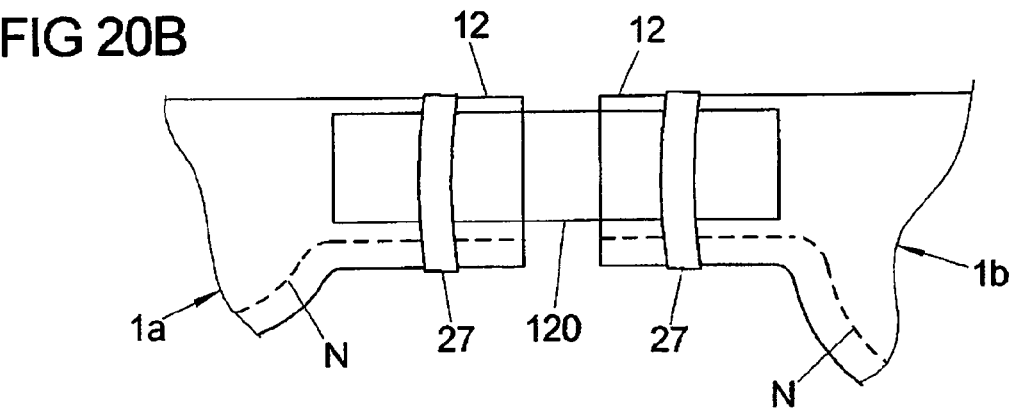
Figure 20C:
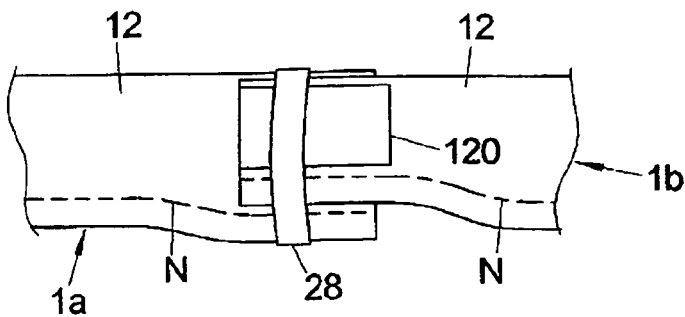

In the FIGS. 20a to 20c further variants for connecting components of an airbag device are shown.

According to FIG. 20a fastening bolts 66 protrude from a gas generator 6, which respectively reach through a fastening opening in a first inflatable region 1a of the airbag device as well as in a connection channel 2 of the airbag device, which is combined with a second inflatable region 1b to form a module. Using nuts screwed on the fastening bolts, a connection is established between the first inflatable region 1a and the connection channel 2 and therefore the whole module comprising the connection channel 2 in the region of the gas generator 6.

According to FIGS. 20b and 20c two inflatable regions 1a, 1b of an airbag device being spaced apart with respect to each other each comprise a connection portion 12 that is respectively directed towards the other one of the two inflatable regions 1a, 1b. These two connection portions 12 form a connection region together, via which the two inflatable regions 1a, 1b, under additional use of a connection tube 120, stand in communication, to be more precisely, in flow communication. The connection tube 120 is thereby arranged in said connection region of the airbag device.

Both connection portions 12 are connected to the connection tube 120 by means of a ring-shaped fastening element 27 or 28, which encompasses the connection tube 120 under interposition of at least one of the connection portions 12 in a ring-shaped manner and hereby fastens the respective connection portion 12 to the connection tube 120.

In case of the embodiment shown in FIG. 20*b* an own fastening ring 27 is thereby associated to each of the connection regions 12, whereas in case of the embodiment shown in FIG. 20*c* a single fastening ring 28 fastens both connection portions 12 to the connection tube 120.

Figure 21A:
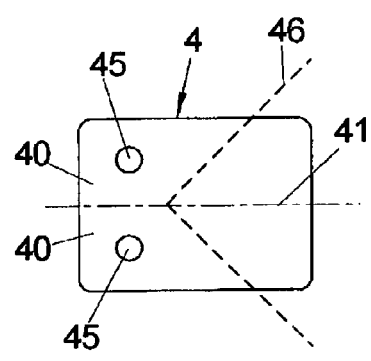
FIGS. 21a-21c show an embodiment for arranging and fixing of fastening flaps on an airbag device.
Figure 21B:
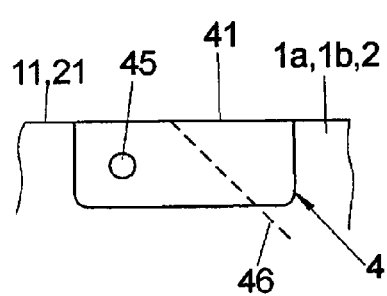
Figure 21C:
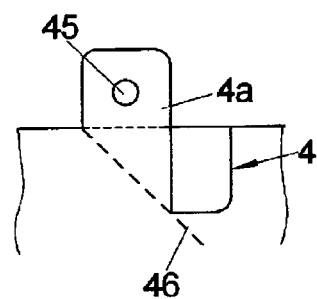

In the FIGS. 21*a* to 21*c* a first embodiment of fastening flaps 4 is shown, which can serve for fastening an airbag device of the kind shown by means of FIGS. 12 to 18*b* to the structure of a motor vehicle.

According to the FIGS. 21*a* to 21*c*, the fastening flaps 4 are each designed two-layered, wherein the two material layers 40 (being designed mirror-symmetrically with respect to each other) of a respective fastening flap 4 (for instance in the form of fabric layers) are integrally connected to each other along a symmetry axis or folding line 41 according to the butterfly-principle, so that the two-layer fastening flaps 4 are each designed in one-piece.

A respective fastening flap 4 is fixed to an associated component of the airbag device, for instance to one of the inflatable regions 1*a*, 1*b* or to a connection channel 2 in a way, that each of the two layers 40 of a fastening flap 4 is respectively connected to a layer 10*a*, 10*b* or 20 of the corresponding component 1*a*, 1*b*, 2, compare FIGS. 15*a* and 16*a*.

The fixation of a respective layer 40 of the fastening flap 4 to a layer of the associated component 1*a*, 1*b* or 2 of the airbag device is thereby established via a seam 46 which in the embodiment of the FIGS. 21*a* to 21*c* runs inclined (for instance under an angle of 45°) with respect to the symmetry axis or folding line 11, 21 of the respectively associated component 1*a*, 1*b*, 2 of the airbag device. After producing said connection seam 46 for connecting a respective material layer 40 of the fastening flap 4 to an associated material layer 10*a*, 10*b*, 20 of a component 1*a*, 1*b*, 2 of the airbag device, each of the two material layers 40 of the fastening flap 4 is folded with a free end portion (fastening portion) around said connection seam 46 running inclined, so that the layers 40 are respectively positioned with a free end above the symmetry axis or folding line 11, 21 of the associated component 1*a*, 1*b* or 2 of the airbag device.

The free end portions of a fastening flap 4 serving as fastening portions are each provided with a fastening opening 45, wherein the fastening openings 45 of the two layers 40 cover each other or are aligned with each other in the folded around the seam 46 state, so that they form a continuous fastening opening for fastening to a motor vehicle structure, for instance by means of screws or rivets.

Figure 25:
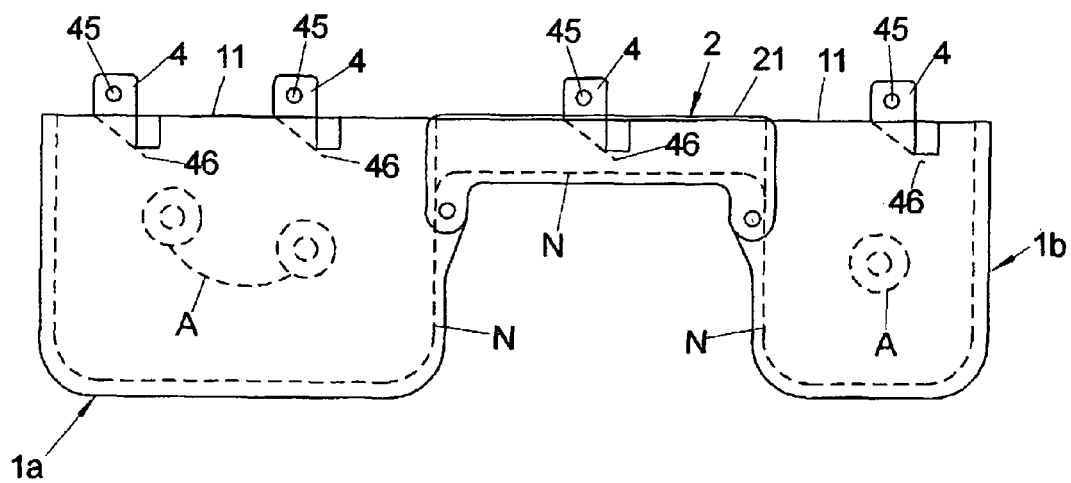
FIG. 25 shows an airbag device serving as a head protection device having fastening flaps of the kind shown in FIGS. 21a to 21c.

FIG. 25 shows the application of fastening flaps 4 of the kind shown in FIGS. 21*a* to 21*c* to an airbag device that comprises two inflatable regions 1*a*, 1*b* spaced apart with respect to each other and a connection channel 2 connecting the two inflatable regions 1*a*, 1*b*. Fastening flaps 4 of the afore-described kind are thereby provided at both of the inflatable regions 1*a*, 1*b* as well as at the connection channel 2, namely in the region of an upper edge, respectively, of the respective component 1*a*, 1*b*, 2, which in turn are here exemplary formed by a symmetry axis or folding line 11, 21.

Figure 22A:
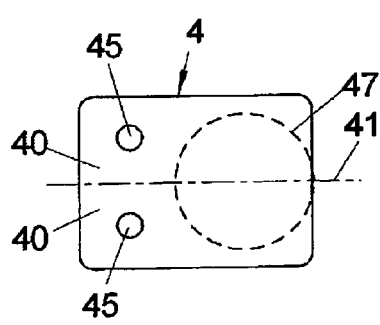
FIGS. 22a-22c show a first modification of the embodiment according to FIGS. 21a to 21c.
Figure 22B:
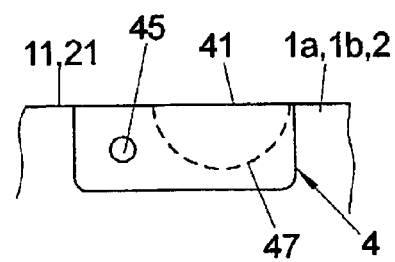
Figure 22C:
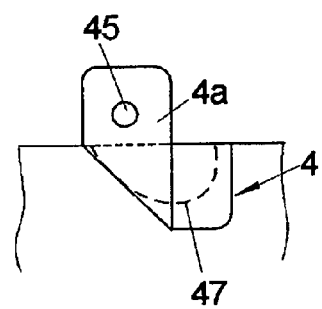
Figure 23A:
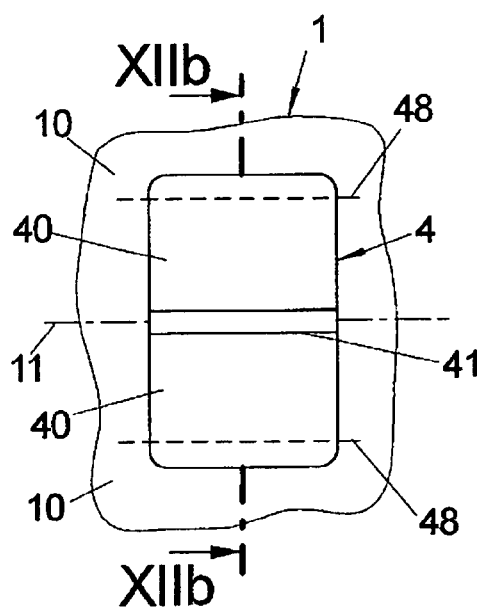
FIG. 23a-23d show a second modification of the embodiment according to FIGS. 21a to 21c.
Figure 23B:
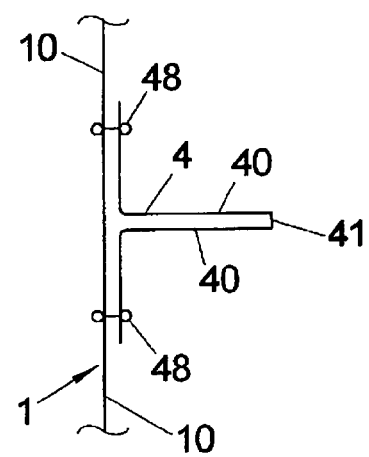
Figure 23C:
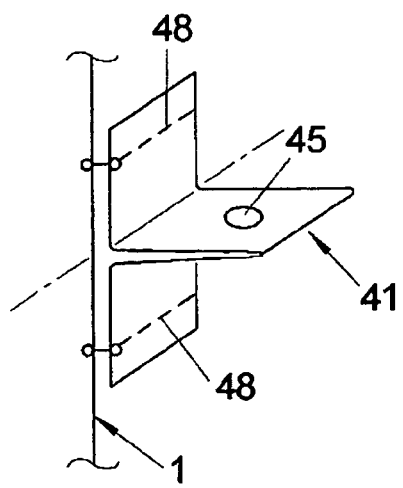
Figure 23D:
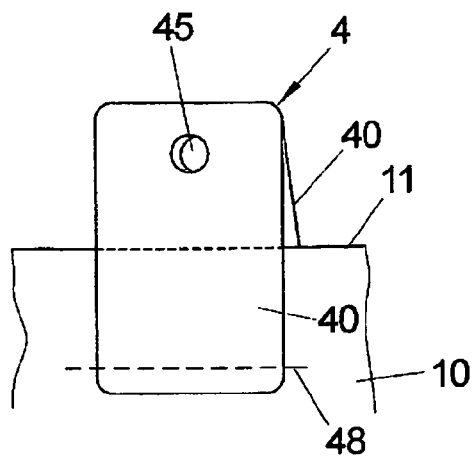
Figure 24A:
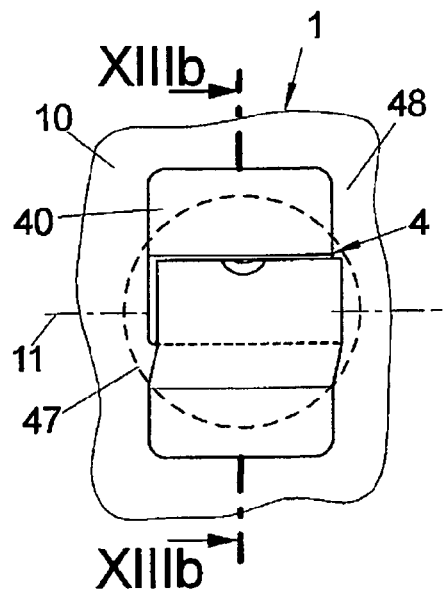
FIG. 24a-24d show a third modification of the embodiment according to FIGS. 21a to 21c.
Figure 24B:
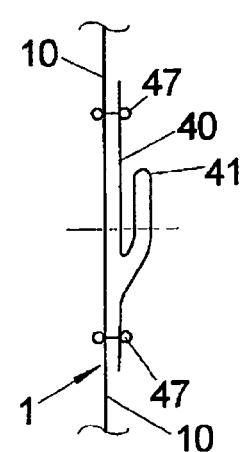
Figure 24C:
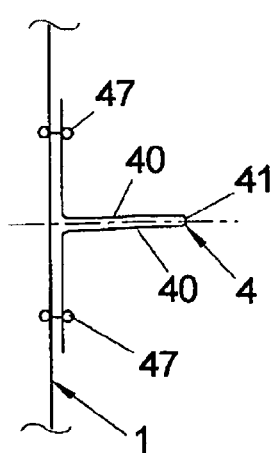
Figure 24D:
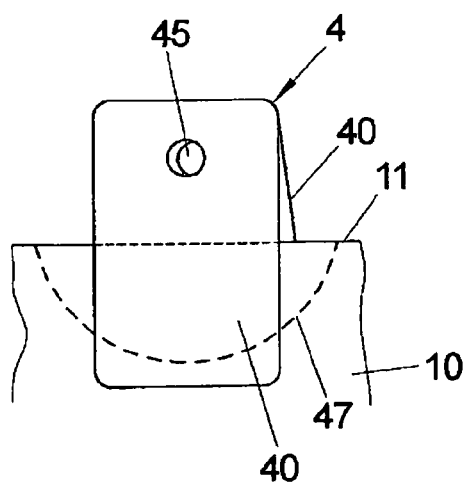

In the FIGS. 22*a* to 22*c* a further modification of the arrangement of the FIGS. 21*a* to 21*c* is shown, wherein the difference lies in the fact, that according to the FIGS. 22*a* to 22*c* the seam 47, via which the fastening flap 4 is fastened to an associated component 1*a*, 1*b* or 2 of an airbag device, is formed as a curved seam, here concretely as a seam running in an arcuated manner along a circular path. Hereby, different folding angles of the free end portions of the two material layers 40 of the fastening flap 4 can be realized, depending on about which region of the fastening seam 47 the free end portions are folded.

In case the component 1*a*, 1*b*, 2 of the airbag device, to which a respective fastening flap 4 is associated, is not a component designed according to the butterfly-principle having a symmetry axis or folding line, the respective folding flap 4 is advantageously attached generally in the region of the upper boundary/the upper edge of the corresponding component 1*a*, 1*b*, 2, which is associated to the roof edge of the motor vehicle; and the corresponding seams 46, 47 then run inclined or curved with respect to the upper edge of the respective component 1*a*, 1*b*, 2 (which in the embodiment at hand of FIGS. 21*a* to 21*c* or 22*a* to 22*c* is especially formed by a symmetry axis or folding line 11, 21). In general it can also be an arbitrary upper edge of an airbag device serving as a head protection device that is associated to the roof edge region of a motor vehicle.

Of course, the fastening flaps 4 can also be provided at other regions of an airbag device, for instance at lateral edges or also at a lower edge that faces the vehicle floor and lies for instance in the built-in state of the airbag device in the region of the door rail of a motor vehicle door.

In the FIGS. 23*a* to 23*d* a variant of a fastening flap 4 is shown which is fixed by means of seams 48 running parallel to the upper edge 11 (for instance in the form of a symmetry axis or a folding line) of an inflatable region 1 or to any other component of an airbag device to said airbag device, namely in the way, that every layer 40 of the integral, two-layer fastening flap 4 is fixed to a respective material layer of the associated component 1 of the airbag device. Thereby, the fastening flap 4 forms a loop in the fixed state having a fastening opening 45 via which a fastening to a vehicle structure can take place, for instance by means of fastening bolts, screws or rivets.

In contrast to the fastening flaps shown by means of FIGS. 21*a* to 21*c* as well as 22*a* to 22*c*, no turning down of free end portions takes place here in order to bring them into their functioning positions; but rather the fastening flap 4 of the FIGS. 23*a* to 23*d* comprises directly after its fixation to an associated component 1 of an airbag device in each of its two layers 40 a fastening portion having a fastening opening 45 and protruding beyond the upper edge 11 of said component 1, respectively, which fastening portion is delimited amongst other things by the folding line 41 of the fastening flap 4.

In the FIGS. 24*a* to 24*d* a modification of the arrangement of FIGS. 23*a* to 23*d* is shown, wherein the essential difference lies in the fact that for fastening the fastening flap 4 in the form of a fastening loop, curved seams, here in the form of arcuated seams running along a circular path, are used.

Figure 26A:
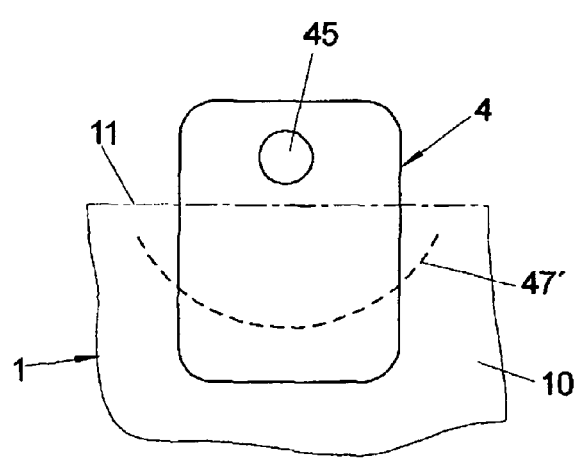
FIG. 26a-26b show a further embodiment for arranging and fixing of fastening flaps on an airbag device.
Figure 26B:
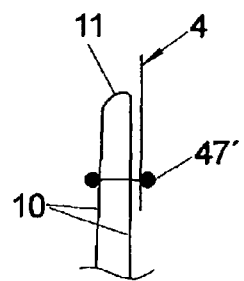

Finally, in the FIGS. 26*a* and 26*b* a one-sidedly fixed, particularly sewn-on, fastening flap 4 is shown, which is fastened in the region of the upper edge 11 of a (two-layer) component 1 of an airbag device to said component 1, namely using a seam 47' which at the same time connects two layers 10 of said component 1 of the airbag device to each other and hereby defines a constriction in said component 1. Here, the fastening flap 4 can be joined after reverting and, as the case may be, folding of the component 1 forming an inflatable airbag region.

Figure 27:
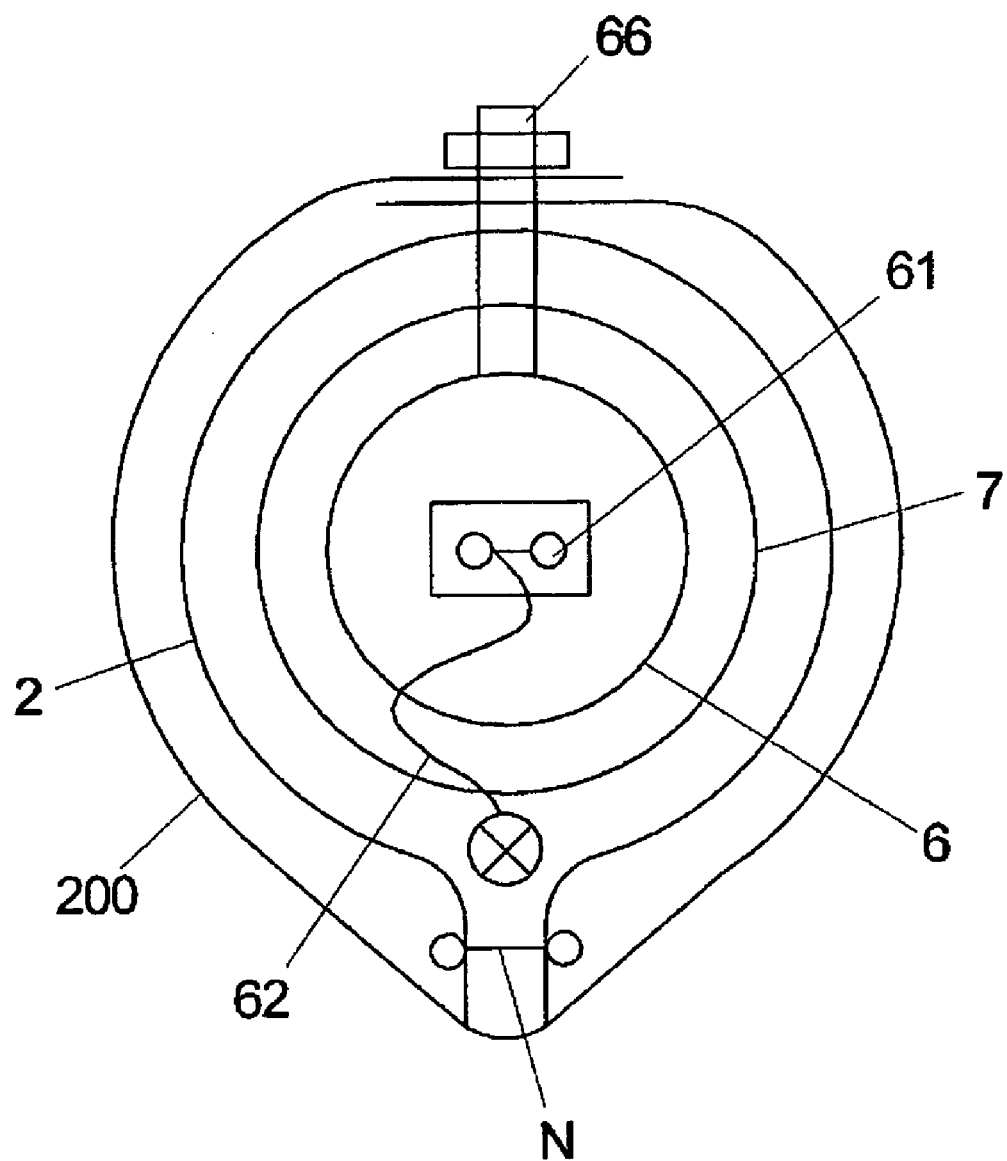
FIG. 27 shows an example for the arrangement of a gas generator in a connection channel that connects two inflatable regions of an airbag device serving as a head protection device.

FIG. 27 shows a cross section through a connection region 2, e.g. in the form of a connection channel) of an airbag device of the afore-described kind, in which a gas generator 6 is arranged. The gas generator 6 is arranged in a (here dimensionally stable but also flexibly designable) tubular receptacle 7 consisting e.g. out of metal, as it is shown also in FIGS. 32a to 32c. The tubular receptacle 7 surrounds the gas generator 6 that is designed here as a tubular gas generator in a ring-shaped manner, so that gas leaving the gas generator 6 firstly gets to the interior of the tubular receptacle 7 and afterwards escapes in the axial direction through frontal outlets of the tubular receptacle, wherein for instance each of the two frontal outlets 71, 72, as shown in FIG. 32c, can be associated to an inflatable region of the airbag device.

The gas generator 6 comprises an electrical connection 61 for an ignition cable 62 via which the gas generator 6 can be ignited in case of a crash in a sensor-controlled manner. The ignition cable 62 extends in the radial direction starting from an electrical connection 61 at an axial end of the gas generator 6 over the gas generator 6 and the tubular receptacle 7 into a region of the space enclosed by the connection region 2 outside the tubular receptacle 7 and is there further passed in the axial region. By means of a bandage 200 surrounding the connection channel 2, the ignition cable 62 can then be sealingly passed out of the space enclosed by the connection region 2, in order to establish an electrical connection to a control electronics for controlling the gas generator 6.

The tubular receptacle 7 arranged between the connection region 2 and the gas generator 6, the connection region 2 itself as well as the bandage 200 surrounding the connection region 2 are thereby connected to the gas generator 6 via fastening bolts 66 protruding from the gas generator 6 and associated nuts, so that said components 6, 7, 2, 200 form a constructional unit.

In the FIGS. 32a to 32c an assembly formed out of a gas generator 6 and a dimensionally stable, tubular or barrel-shaped receptacle 7 is shown once more in greater detail, namely in FIG. 32a in the form of two single parts and in the FIGS. 32b and 32c in the assembled state, in which the tubular receptacle 7, which is formed oval in cross section here, is attached to the gas generator 6 by means of fastening bolts 66 protruding from the gas generator 6 and associated nuts.

As becomes clear particularly by means of FIG. 32c, the tubular receptacle 7 extends in the axial direction of the gas generator 6 for example over the same length like the gas generator 6 itself; and it serves for forwarding gases G that during operation of the gas generator 6 escape through outlet openings 60 in the gas generator's lateral area and are then deflected in the axial direction by means of the tubular receptacle 7 and are thereby divided into two partial gas flows. The two partial gas flows then exit opposite with respect to each other in the axial direction out of two opposing frontal outlets 71, 72 of the barrel-shaped receptacle 7, from where they can get into a respective region of an airbag device that is to be inflated.

Figure 28A:
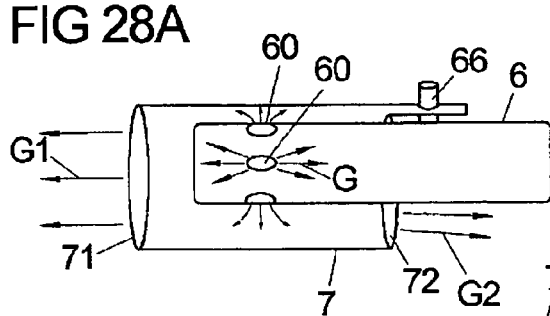
FIG. 28a shows a first embodiment of a barrel-shaped gas stream distributor for partitioning the gas stream leaving a gas generator of the airbag device.
Figure 28B:
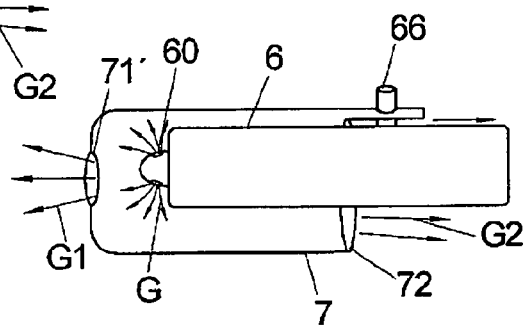
FIG. 28b shows a second embodiment of a barrel-shaped gas stream distributor for partitioning the gas stream leaving a gas generator of the airbag device.

In the FIGS. 28a and 28b two further embodiments of tubular or barrel-shaped gas flow distributors 7 are shown, which are each attached by means of at least one fastening bolt 66 to the gas generator 6 and which divide a gas flow G leaving the gas generator 6 into two partial gas flows G1, G2 which each leave the gas generator 6 through a respective outlet 71, 71' or 72. In the cases of FIGS. 28a and 28b, the respective gas flow distributor 7 does thereby not extend over the whole length of the gas generator 6 in the axial direction.

The embodiments of the FIGS. 28a and 28b differ with respect to each other on the one hand in that in the case of FIG. 28a the outlet openings 60 of the gas generator 6 are provided in the lateral area of the latter, while in the case of FIG. 28b they are arranged frontally at the gas generator. A further difference consists in the fact that in the case of FIG. 28b the two frontal gas outlets 71', 72 of the gas flow distributor 7 comprise a different exhaust area, so that here two inflatable regions of an airbag device can be filled with a different amount of gas.

Further details of such gas flow distributors are described for instance in WO 2007/062847 A1.

Figure 29A:
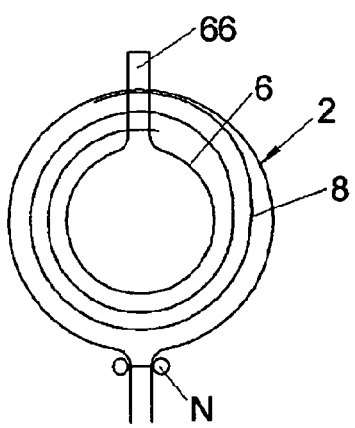
FIG. 29a, 29b show a first embodiment of a wrapped protection layer for protecting the fabric of a connection channel of the airbag device against hot gases streaming out of a gas generator.
Figure 29B:
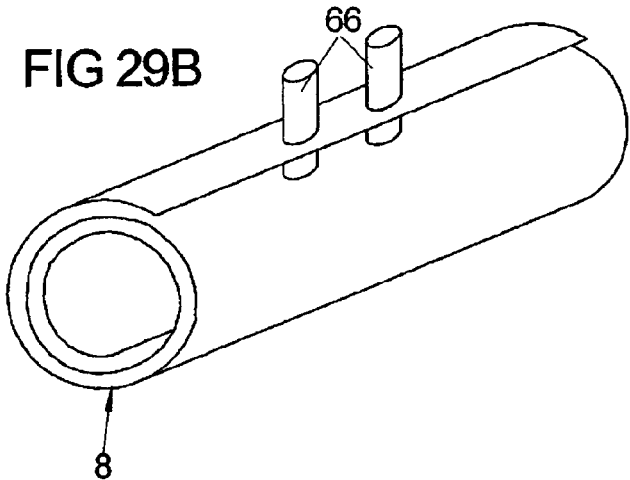

In the FIGS. 29a and 29b an arrangement is shown according to which a gas generator 6 arranged in a connection channel 2 of an airbag device is surrounded by a protection layer sleeve 8 as a flame protection or protection against high pressures, which is spirally wound around the gas generator 6 in cross section. The protection layer sleeve 8 is attached together with the connection channel 2 to the gas generator 6 by means of fastening bolts 66.

Figure 30A:
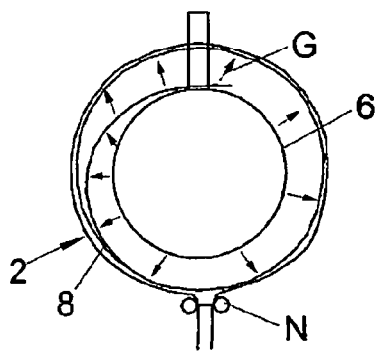
FIG. 30a, 30b show the arrangement of FIGS. 29a and 29b after escape of gas out of a gas generator.
Figure 30B:
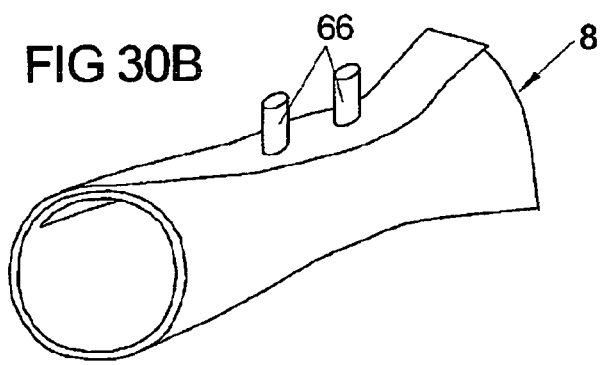

The FIGS. 30a and 30b show the arrangement of FIGS. 29a and 29b in a state, in which a gas flow G leaves the gas generator 6 for inflating the airbag device, wherein the protection layer sleeve 8 is unwound and pressed outwardly against the inner surface of the connection channel 2.

In this respect it is to be noted that in the FIGS. 29a and 30a the protection layer sleeve 8 is shown together with the gas generator 6 and the connection channel 2, respectively, while in the perspective illustrations of FIGS. 29b and 30b the protection layer sleeve 8 is shown alone or together with a fastening bolt 66 for the sake of clarity, respectively.

In the FIGS. 31a and 31b an embodiment of a protection layer 8 is shown, which in the wound state comprises fixation portions 85 protruding in the axial direction, to which the protection layer sleeve in the wound state can be fixed provisionally by means of tear seams 8. The connections along the tear seams 86 tear open in case an increased gas pressure acts on the protection layer sleeve 8 of FIGS. 31a and 31b by means of gases flowing out of a gas generator. This allows for an unwinding and radial expansion of the protection layer sleeve 8 as explained by means of FIGS. 30a and 30b.

Finally, a flame protection is illustrated in the FIG. 33, which is achieved by means of a fabric hose 9 arranged inside the connection region 2 (in the form of a connection channel), which is provided or coated with a heat-resistant material layer 9a on its inner side. This one faces a gas generator that is to be arranged inside the connection region 2.

The airbag devices described by means of the preceding Figures can be configured as a non-sealed head airbag variant or also as a sealed system, particularly by sealing in the region of the gas generator as described by means of FIG. 27.

For a design that is particularly suitable for production, the components of a respective construction kit can be synchronized for joining and can be configured manufacturable with so called poka-yoke-features.

The assemblies described above can be realized in principle with all types of generators, like e.g. pyro, hybrid or cold gas generators.

The priority application, German Utility Application No. 20 2007 015 431.3, filed Oct. 30, 2007 including the specification, drawings, claims and abstract, is incorporated herein by reference in its entirety.

Given the disclosure of the present invention, one versed in the art would appreciate that there may be other embodiments and modifications within the scope and spirit of the invention. Accordingly, all modifications attainable by one versed in the art from the present disclosure within the scope and spirit of the present invention are to be included as further embodiments of the present invention. The scope of the present invention is to be defined as set forth in the following claims.

What is claimed is:

1. An airbag module for a motor vehicle, comprising:
an airbag that can be inflated in order to protect a person, the airbag forming a covering that defines an interior space that can be filled with gas for inflating the airbag,
a gas generator for providing the gas needed for inflating the airbag,
an insertion opening of the airbag covering, wherein the gas generator is inserted through the insertion opening into the interior space of the airbag, so that gas provided by the gas generator can get into the interior space of the airbag,
a boundary region of the insertion opening delimiting the insertion opening, the boundary region annularly encompassing the gas generator, and
a sealing means for sealing the insertion opening,
wherein the sealing means is arranged between the boundary region and the gas generator in a way that the sealing means is widened by means of the gas provided by the gas generator and pressed against the boundary region of the insertion opening for sealing the insertion opening, wherein the sealing means is pressed with a middle portion circulating the gas generator against the boundary region of the insertion opening.

2. The airbag module according to claim 1, wherein the middle portion of the sealing means is arranged with respect to the at least one outflow opening of the gas generator in a way that gas flowing out of the at least one outflow opening hits the middle portion, wherein the middle portion widens in cross section in a cross section plane that is perpendicular to the direction in which the gas generator has been inserted into the airbag.

3. The airbag module according to claim 1, wherein the sealing means is fixed to the gas generator by means of a clamping element.

4. The airbag module according to claim 3, wherein the clamping element is designed to press a first end portion of the sealing means against the gas generator so that the sealing means tightly butts against the gas generator with the first end portion of the sealing means.

5. The airbag module according to claim 1, wherein the sealing means comprises a first end portion connected to the middle portion and is particularly integrally formed with the middle portion.

6. The airbag module according to claim 5, wherein the first end portion of the sealing means is arranged outside the interior space of the airbag.

7. The airbag module according to claim 5, wherein the first end portion of the sealing means is connected to a second end portion of the sealing means via the middle portion, which is arranged inside the interior space of the airbag,
wherein the second end portion of the sealing means is integrally formed with the middle portion of the sealing means, and
wherein the layers of the material layer forming the wall and lying on top of one another are connected to each other at the second end portion by means of a connection in a way that the second end portion widens less than the middle portion of the sealing means or does not widen at all, and
wherein the sealing means is fastened to the airbag covering via the second end portion.

8. The airbag module according to claim 7, wherein a diffuser is integrally formed with the second end portion of the sealing means for distributing the gas that is to be provided by the gas generator, wherein the sealing means is fastened to the airbag covering via the diffuser.

9. The airbag module according to claim 1, wherein the sealing means is formed out of at least one flexible material layer, wherein at least one part of the material layer is wound up along a winding direction for forming the sealing means so that the material layer forms a circulating wall of the sealing means that defines a receptacle for the gas generator, and wherein the middle portion of the sealing means circulates along the winding direction.

10. The airbag module according to claim 9, wherein the material layer overlaps along the winding direction so that the wall comprises two layers lying on top of one another, wherein the wall comprises along its whole periphery running along the winding direction at least two layers of the material layer lying on top of one another.

11. The airbag module according to claim 10, wherein the layers of the material layer lying on top of one another and forming the wall are connected to each other at a first end portion of the sealing means by means of a connection such that the first end portion of the sealing means widens less than the middle portion of the sealing means or does not widen at all.

12. The airbag module according claim 1, wherein the gas generator is inserted into the insertion opening along an insertion direction, and the airbag covering comprises at least two airbag parts which—related to a flatly outspread state of the airbag covering, in which the two airbag parts lie on top of each other flatly outspread—are integrally formed with each other along an outermost boundary portion of the airbag covering extending along the insertion direction.

13. The airbag module according to claim 12, wherein the boundary portion comprises a cut running across the boundary portion, so that said boundary portion is divided into a first and a second portion, wherein the first portion is folded in towards the interior space of the airbag covering so that the cut forms the insertion opening and the folded-in first portion butts against the gas generator under interposition of the sealing means.

14. The airbag module according to claim 13, further comprising a loop fastened to the airbag covering that faces the insertion opening along the insertion direction, wherein the loop together with the first portion of the boundary portion of the airbag covering annularly encompasses the gas generator in a plane running perpendicular to the insertion direction.

15. A method for producing an airbag, comprising the steps of:
providing an airbag, the airbag forming a covering that defines an interior space of the airbag that can be filled with gas for inflating the airbag;
inserting a sealing means into the insertion opening so that a boundary region of the insertion opening delimiting the insertion opening annularly encompasses a circumferential middle portion of the sealing means that forms a receptacle for the gas generator; and
inserting the gas generator into the receptacle of the sealing means, such that gas that is to be provided by the gas generator can get into the interior space of the airbag and can widen the middle portion and press it against the boundary region of the insertion opening.

* * * * *

UNITED STATES PATENT AND TRADEMARK OFFICE
CERTIFICATE OF CORRECTION

| | | |
|---|---|---|
| PATENT NO. | : 7,988,191 B2 | |
| APPLICATION NO. | : 12/662612 | |
| DATED | : August 2, 2011 | |
| INVENTOR(S) | : Christian Weyrich | |

It is certified that error appears in the above-identified patent and that said Letters Patent is hereby corrected as shown below:

Title Page, Item (54) should read as follows:

--(54) AIRBAG MODULE--.

Signed and Sealed this
Twenty-seventh Day of December, 2011

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 7,988,191 B2 | |
| APPLICATION NO. | : 12/662612 | |
| DATED | : August 2, 2011 | |
| INVENTOR(S) | : Christian Weyrich | |

It is certified that error appears in the above-identified patent and that said Letters Patent is hereby corrected as shown below:

Title Page, Item (54) and at Column 1, line 1, Title should read as follows:

--AIRBAG MODULE--.

This certificate supersedes the Certificate of Correction issued December 27, 2011.

Signed and Sealed this
Thirty-first Day of January, 2012

David J. Kappos
*Director of the United States Patent and Trademark Office*